United States Patent
Kim et al.

(10) Patent No.: US 10,237,890 B2
(45) Date of Patent: Mar. 19, 2019

(54) METHOD FOR SENSING UNLICENSED BAND AND DEVICE THEREFOR

(71) Applicant: LG ELECTRONICS INC., Seoul (KR)

(72) Inventors: Kijun Kim, Seoul (KR); Joonkui Ahn, Seoul (KR); Byounghoon Kim, Seoul (KR); Hanbyul Seo, Seoul (KR); Seungmin Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 66 days.

(21) Appl. No.: 15/506,222

(22) PCT Filed: Sep. 21, 2015

(86) PCT No.: PCT/KR2015/009868
§ 371 (c)(1),
(2) Date: Feb. 23, 2017

(87) PCT Pub. No.: WO2016/047975
PCT Pub. Date: Mar. 31, 2016

(65) Prior Publication Data
US 2018/0220447 A1    Aug. 2, 2018

Related U.S. Application Data

(60) Provisional application No. 62/054,968, filed on Sep. 24, 2014.

(51) Int. Cl.
*H04W 72/14* (2009.01)
*H04L 5/00* (2006.01)
(Continued)

(52) U.S. Cl.
CPC .......... *H04W 72/14* (2013.01); *H04L 5/0053* (2013.01); *H04W 16/14* (2013.01);
(Continued)

(58) Field of Classification Search
CPC . H04W 72/14; H04W 72/1263; H04W 16/14; H04W 72/0406; H04L 5/0053; H04L 5/001
(Continued)

(56) References Cited

U.S. PATENT DOCUMENTS

2013/0336156 A1    12/2013  Wei et al.
2014/0003387 A1*   1/2014   Lee .................... H04L 5/001
                                                              370/330
(Continued)

FOREIGN PATENT DOCUMENTS

WO    2012078565    6/2012
WO    2013006006    1/2013

OTHER PUBLICATIONS

PCT International Application No. PCT/KR2015/009868, Written Opinion of the International Searching Authority dated Jan. 11, 2016, 21 pages.

*Primary Examiner* — Kwang B Yao
*Assistant Examiner* — Syed M Bokhari
(74) *Attorney, Agent, or Firm* — Lee Hong Degerman Kang Waimey

(57) ABSTRACT

A method by which a terminal performs an uplink (UL) transmission in a unlicensed band-secondary carrier, according to one embodiment of the present invention, comprises the steps of: receiving, in a primary carrier, a first channel including a unlicensed band UL prescheduling approval and a second channel including a unlicensed band UL transmission triggering approval; determining whether the unlicensed band UL transmission has been permitted, on the basis of the received first and second channels; and if it is determined that the unlicensed band UL transmission has been permitted, performing the UL transmission through a channel of the unlicensed band-secondary carrier only if the channel of the unlicensed band-secondary carrier is an idle (Continued)

state, wherein the first channel and the second channel can be received sequentially in predetermined time intervals.

12 Claims, 17 Drawing Sheets

(51) Int. Cl.
*H04W 16/14* (2009.01)
*H04W 72/04* (2009.01)
*H04W 72/12* (2009.01)
*H04W 74/02* (2009.01)
*H04W 74/00* (2009.01)
*H04W 74/08* (2009.01)

(52) U.S. Cl.
CPC ... *H04W 72/0406* (2013.01); *H04W 72/1263* (2013.01); *H04W 74/02* (2013.01); *H04L 5/001* (2013.01); *H04W 72/1289* (2013.01); *H04W 74/006* (2013.01); *H04W 74/0808* (2013.01)

(58) Field of Classification Search
USPC .................................................. 370/329, 330
See application file for complete search history.

(56) References Cited

U.S. PATENT DOCUMENTS

| | | | |
|---|---|---|---|
| 2014/0036818 A1 | 2/2014 | Koskela et al. | |
| 2016/0183293 A1* | 6/2016 | Lei | H04W 72/14 370/329 |
| 2017/0142743 A1* | 5/2017 | Yoon | H04L 5/0048 |
| 2017/0332358 A1* | 11/2017 | Park | H04W 72/042 |

* cited by examiner

METHOD FOR SENSING UNLICENSED BAND AND DEVICE THEREFOR

CROSS-REFERENCE TO RELATED APPLICATIONS

This application is the National Stage filing under 35 U.S.C. 371 of International Application No. PCT/KR2015/009868, filed on Sep. 21, 2015, which claims the benefit of U.S. Provisional Application No. 62/054,968, filed on Sep. 24, 2014, the contents of which are all hereby incorporated by reference herein in their entirety.

TECHNICAL FIELD

The present invention relates to a wireless communication system, and more particularly, to a method of sensing an unlicensed band and an apparatus therefor.

BACKGROUND ART

Recently, various devices requiring machine-to-machine (M2M) communication and high data transfer rate, such as smartphones or tablet personal computers (PCs), have appeared and come into widespread use. This has rapidly increased the quantity of data which needs to be processed in a cellular network. In order to satisfy such rapidly increasing data throughput, recently, carrier aggregation (CA) technology which efficiently uses more frequency bands, cognitive ratio technology, multiple antenna (MIMO) technology for increasing data capacity in a restricted frequency, multiple-base-station cooperative technology, etc. have been highlighted. In addition, communication environments have evolved such that the density of accessible nodes is increased in the vicinity of a user equipment (UE). Here, the node includes one or more antennas and refers to a fixed point capable of transmitting/receiving radio frequency (RF) signals to/from the user equipment (UE). A communication system including high-density nodes may provide a communication service of higher performance to the UE by cooperation between nodes.

A multi-node coordinated communication scheme in which a plurality of nodes communicates with a user equipment (UE) using the same time-frequency resources has much higher data throughput than legacy communication scheme in which each node operates as an independent base station (BS) to communicate with the UE without cooperation.

A multi-node system performs coordinated communication using a plurality of nodes, each of which operates as a base station or an access point, an antenna, an antenna group, a remote radio head (RRH), and a remote radio unit (RRU). Unlike the conventional centralized antenna system in which antennas are concentrated at a base station (BS), nodes are spaced apart from each other by a predetermined distance or more in the multi-node system. The nodes can be managed by one or more base stations or base station controllers which control operations of the nodes or schedule data transmitted/received through the nodes. Each node is connected to a base station or a base station controller which manages the node through a cable or a dedicated line.

The multi-node system can be considered as a kind of Multiple Input Multiple Output (MIMO) system since dispersed nodes can communicate with a single UE or multiple UEs by simultaneously transmitting/receiving different data streams. However, since the multi-node system transmits signals using the dispersed nodes, a transmission area covered by each antenna is reduced compared to antennas included in the conventional centralized antenna system. Accordingly, transmit power required for each antenna to transmit a signal in the multi-node system can be reduced compared to the conventional centralized antenna system using MIMO. In addition, a transmission distance between an antenna and a UE is reduced to decrease in pathloss and enable rapid data transmission in the multi-node system. This can improve transmission capacity and power efficiency of a cellular system and meet communication performance having relatively uniform quality regardless of UE locations in a cell. Further, the multi-node system reduces signal loss generated during transmission since base station(s) or base station controller(s) connected to a plurality of nodes transmit/receive data in cooperation with each other. When nodes spaced apart by over a predetermined distance perform coordinated communication with a UE, correlation and interference between antennas are reduced. Therefore, a high signal to interference-plus-noise ratio (SINR) can be obtained according to the multi-node coordinated communication scheme.

Owing to the above-mentioned advantages of the multi-node system, the multi-node system is used with or replaces the conventional centralized antenna system to become a new foundation of cellular communication in order to reduce base station cost and backhaul network maintenance cost while extending service coverage and improving channel capacity and SINR in next-generation mobile communication systems.

DISCLOSURE OF THE INVENTION

Technical Task

The present invention relates to a procedure for using a carrier of an unlicensed band as a secondary carrier in a wireless communication system.

Technical tasks obtainable from the present invention are non-limited the above-mentioned technical task. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, according to one embodiment, a method of performing uplink (UL) transmission, which is performed by a terminal on an unlicensed band-secondary carrier, includes receiving a first channel in which an unlicensed band UL pre-scheduling grant is included and a second channel in which an unlicensed band UL transmission triggering grant is included on a primary carrier, determining whether or not the unlicensed band UL transmission is granted based on the received first channel and the second channel, and if it is determined that the unlicensed band UL transmission is permitted, performing the UL transmission via a channel of the unlicensed band-secondary carrier only when the channel of the unlicensed band-secondary carrier is in an idle state. In this case, the first channel and the second channel may be sequentially received with a predetermined time interval.

Additionally or alternately, if the second channel is received at a predetermined timing after the first channel is received, the method may further include determining that the unlicensed band UL transmission is granted.

Additionally or alternatively, if a second channel including an indicator indicating that the unlicensed band UL transmission is granted is received at predetermined timing after the first channel is received, the method may further include determining that the unlicensed band UL transmission is granted.

Additionally or alternatively, if a second channel is received within a predetermined time window after the first channel is received, the method may further include determining that the unlicensed band UL transmission is granted. In this case, the unlicensed band UL transmission triggering grant included in the second channel may include information on an unlicensed band UL pre-scheduling grant which is a target of the unlicensed band UL transmission triggering grant.

Additionally or alternatively, the unlicensed band UL transmission triggering grant may include information on a length of UL transmission to be transmitted on the unlicensed band.

Additionally or alternatively, the second channel may be received on the unlicensed band-secondary carrier.

Additionally or alternatively, the method may further include performing channel sensing on the channel of the unlicensed-secondary carrier to check whether or not the channel of the unlicensed band-secondary carrier is in an idle state.

Additionally or alternatively, the method may further include comparing the total reception power of the channel of the unlicensed band-secondary carrier with a threshold configured via higher layer signaling. In this case, if the total reception power is greater than the threshold, the channel of the unlicensed band-secondary carrier is determined as a busy state. If the total reception power is no greater than the threshold, the channel of the unlicensed band-secondary carrier can be determined as an idle state.

Additionally or alternatively, the method may further include comparing an increment of an interference amount measured on the channel of the unlicensed band-secondary carrier on an interference amount, which is measured immediately before a sounding reference signal which has been transmitted most recently is transmitted, with a threshold configured via higher layer signaling. In this case, if the increment is greater than the threshold, the channel of the unlicensed band-secondary carrier may be determined as a busy state. If the increment is not greater than the threshold, the channel of the unlicensed band-secondary carrier may be determined as an idle state.

To further achieve these and other advantages and in accordance with the purpose of the present invention, according to a different embodiment, a terminal configured to transmit uplink UL) on an unlicensed band-secondary carrier includes an radio frequency (RF) unit and a processor configured to control the RF unit, the processor configured to receive a first channel in which an unlicensed band UL pre-scheduling grant is included and a second channel in which an unlicensed band UL transmission triggering grant is included on a primary carrier, determine whether or not the unlicensed band UL transmission is granted based on the received first channel and the second channel, if it is determined that the unlicensed band UL transmission is granted, perform the UL transmission via a channel of the unlicensed band-secondary carrier only when the channel of the unlicensed band-secondary carrier is in an idle state. In this case, the first channel and the second channel may be sequentially received with a predetermined time interval.

Additionally or alternatively, if the second channel is received at predetermined timing after the first channel is received, the processor can be configured to determine that the unlicensed band UL transmission is granted.

Additionally or alternatively, if a second channel including an indicator indicating that the unlicensed band UL transmission is granted is received at predetermined timing after the first channel is received, the processor may be configured to determine that the unlicensed band UL transmission is granted.

Additionally or alternatively, if the second channel is received within a predetermined time window after the first channel is received, the processor may be configured to determine that the unlicensed band UL transmission is granted. In this case, the unlicensed band UL transmission triggering grant included in the second channel may include information on an unlicensed band UL pre-scheduling grant which a target of the unlicensed band UL transmission triggering grant.

Additionally or alternatively, the unlicensed band UL transmission triggering grant may include information on a length of UL transmission to be transmitted on the unlicensed band.

Additionally or alternatively, the second channel may be received on the unlicensed band-secondary carrier.

Additionally or alternatively, the processor may be configured to perform channel sensing on the channel of the unlicensed-secondary carrier to check whether or not the channel of the unlicensed band-secondary carrier is in an idle state.

Additionally or alternatively, the processor may be configured to compare the total reception power of the channel of the unlicensed band-secondary carrier with a threshold configured via higher layer signaling. If the total reception power is greater than the threshold, the channel of the unlicensed band-secondary carrier may be determined as a busy state. If the total reception power is equal to or less than the threshold, the channel of the unlicensed band-secondary carrier may be determined as an idle state.

Additionally or alternatively, the processor may be configured to compare an increment of an interference amount measured on the channel of the unlicensed band-secondary carrier on an interference amount, which is measured immediately before a sounding reference signal which has been transmitted most recently is transmitted, with a threshold configured via higher layer signaling. If the increment is greater than the threshold, the channel of the unlicensed band-secondary carrier may be determined as a busy state. If the increment is not greater than the threshold, the channel of the unlicensed band-secondary carrier may be determined as an idle state.

It is to be understood that both the foregoing general description and the following detailed description are exemplary and explanatory and are intended to provide further explanation of the invention as claimed.

Advantageous Effects

According to one embodiment of the present invention, it is able to more efficiently perform wireless communication by aggregating carriers of an unlicensed band.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

BEST MODE

Mode for Invention

Figure 1:
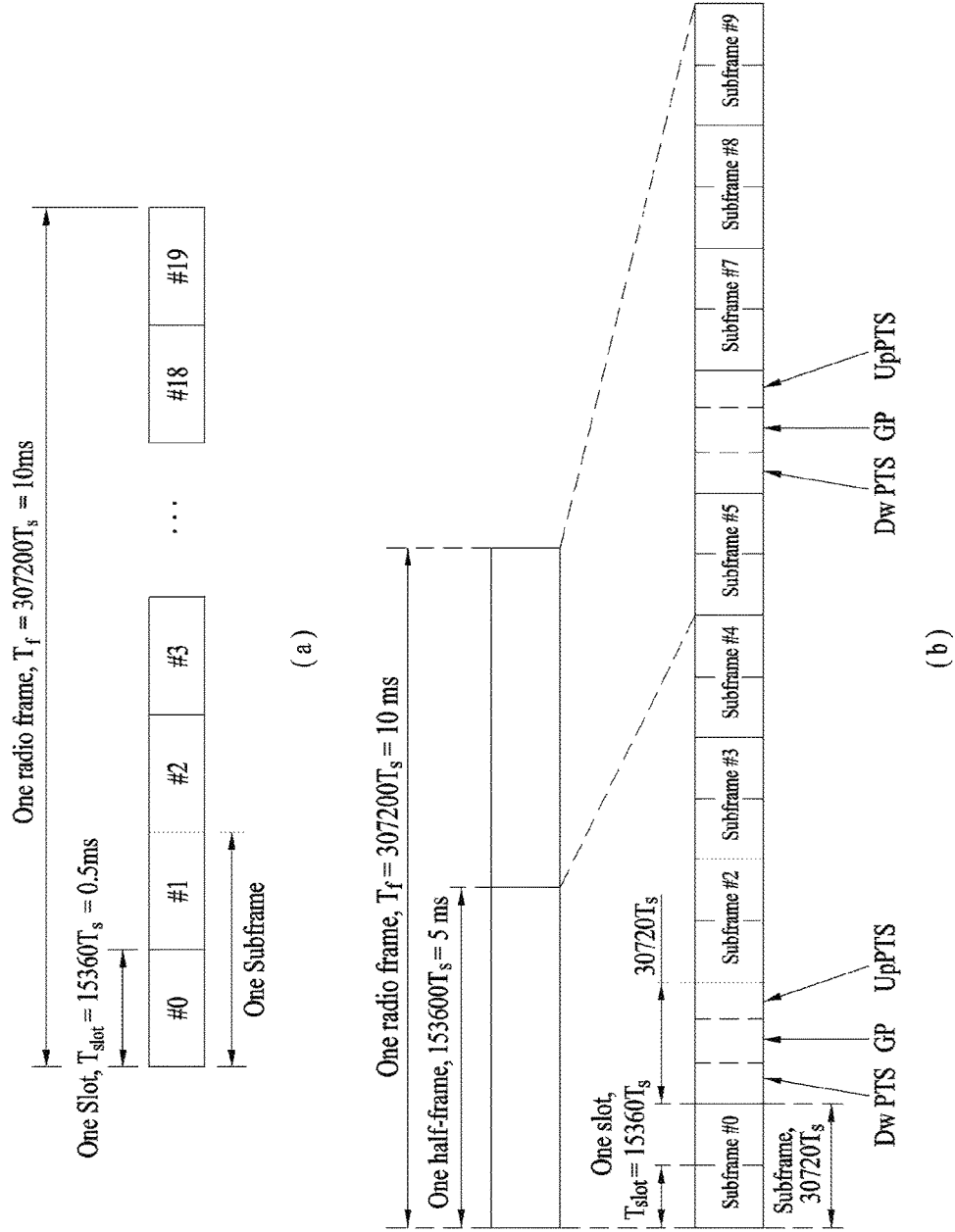
FIG. 1 is a diagram for an example of a radio frame structure used for a wireless communication system.

Reference will now be made in detail to the preferred embodiments of the present invention, examples of which are illustrated in the accompanying drawings. The accompanying drawings illustrate exemplary embodiments of the present invention and provide a more detailed description of the present invention. However, the scope of the present invention should not be limited thereto.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In the present invention, a user equipment (UE) is fixed or mobile. The UE is a device that transmits and receives user data and/or control information by communicating with a base station (BS). The term 'UE' may be replaced with 'terminal equipment', 'Mobile Station (MS)', 'Mobile Terminal (MT)', 'User Terminal (UT)', 'Subscriber Station (SS)', 'wireless device', 'Personal Digital Assistant (PDA)', 'wireless modem', 'handheld device', etc. A BS is typically a fixed station that communicates with a UE and/or another BS. The BS exchanges data and control information with a UE and another BS. The term 'BS' may be replaced with 'Advanced Base Station (ABS)', 'Node B', 'evolved-Node B (eNB)', 'Base Transceiver System (BTS)', 'Access Point (AP)', 'Processing Server (PS)', etc. In the following description, BS is commonly called eNB.

In the present invention, a node refers to a fixed point capable of transmitting/receiving a radio signal to/from a UE by communication with the UE. Various eNBs can be used as nodes. For example, a node can be a BS, NB, eNB, pico-cell eNB (PeNB), home eNB (HeNB), relay, repeater, etc. Furthermore, a node may not be an eNB. For example, a node can be a radio remote head (RRH) or a radio remote unit (RRU). The RRH and RRU have power levels lower than that of the eNB. Since the RRH or RRU (referred to as RRH/RRU hereinafter) is connected to an eNB through a dedicated line such as an optical cable in general, cooperative communication according to RRH/RRU and eNB can be smoothly performed compared to cooperative communication according to eNBs connected through a wireless link. At least one antenna is installed per node. An antenna may refer to an antenna port, a virtual antenna or an antenna group. A node may also be called a point. Unlink a conventional centralized antenna system (CAS) (i.e. single node system) in which antennas are concentrated in an eNB and controlled an eNB controller, plural nodes are spaced apart at a predetermined distance or longer in a multi-node system. The plural nodes can be managed by one or more eNBs or eNB controllers that control operations of the nodes or schedule data to be transmitted/received through the nodes. Each node may be connected to an eNB or eNB controller managing the corresponding node via a cable or a dedicated line. In the multi-node system, the same cell identity (ID) or different cell IDs may be used for signal transmission/reception through plural nodes. When plural nodes have the same cell ID, each of the plural nodes operates as an antenna group of a cell. If nodes have different cell IDs in the multi-node system, the multi-node system can be regarded as a multi-cell (e.g., macro-cell/femto-cell/pico-cell) system. When multiple cells respectively configured by plural nodes are overlaid according to coverage, a network configured by multiple cells is called a multi-tier network. The cell ID of the RRH/RRU may be identical to or different from the cell ID of an eNB. When the RRH/RRU and eNB use different cell IDs, both the RRH/RRU and eNB operate as independent eNBs.

A communication scheme through which signals are transmitted/received via plural transmit (Tx)/receive (Rx) nodes, signals are transmitted/received via at least one node selected from plural Tx/Rx nodes, or a node transmitting a downlink signal is discriminated from a node transmitting an uplink signal is called multi-eNB MIMO or CoMP (Coordinated Multi-Point Tx/Rx). Coordinated transmission schemes from among CoMP communication schemes can be categorized into JP (Joint Processing) and scheduling coordination. The former may be divided into JT (Joint Transmission)/JR (Joint Reception) and DPS (Dynamic Point Selection) and the latter may be divided into CS (Coordinated Scheduling) and CB (Coordinated Beamforming). DPS may be called DCS (Dynamic Cell Selection). When JP is performed, more various communication environments can be generated, compared to other CoMP schemes. JT refers to a communication scheme by which plural nodes transmit the same stream to a UE and JR refers to a communication scheme by which plural nodes receive the same stream from the UE. The UE/eNB combine signals received from the plural nodes to restore the stream. In the case of JT/JR, signal transmission reliability can be improved according to transmit diversity since the same stream is transmitted from/to plural nodes. DPS refers to a communication scheme by which a signal is transmitted/received through a node selected from plural nodes according to a specific rule. In the case of DPS, signal transmission reliability can be improved because a node having a good channel state between the node and a UE is selected as a communication node.

A communication scheme through which signals are transmitted/received via plural transmit (Tx)/receive (Rx) nodes, signals are transmitted/received via at least one node selected from plural Tx/Rx nodes, or a node transmitting a downlink signal is discriminated from a node transmitting an uplink signal is called multi-eNB MIMO or CoMP (Coordinated Multi-Point Tx/Rx). Coordinated transmission schemes from among CoMP communication schemes can be categorized into JP (Joint Processing) and scheduling coordination. The former may be divided into JT (Joint Transmission)/JR (Joint Reception) and DPS (Dynamic Point Selection) and the latter may be divided into CS (Coordinated Scheduling) and CB (Coordinated Beamforming). DPS may be called DCS (Dynamic Cell Selection). When JP is performed, more various communication environments can be generated, compared to other CoMP schemes. JT refers to a communication scheme by which plural nodes transmit the same stream to a UE and JR refers to a communication scheme by which plural nodes receive the same stream from the UE. The UE/eNB combine signals received from the plural nodes to restore the stream. In the case of JT/JR, signal transmission reliability can be improved according to transmit diversity since the same stream is transmitted from/to plural nodes. DPS refers to a communication scheme by which a signal is transmitted/received through a node selected from plural nodes according to a specific rule. In the case of DPS, signal transmission reliability can be improved because a node having a good channel state between the node and a UE is selected as a communication node.

In the present invention, a cell refers to a specific geographical area in which one or more nodes provide communication services. Accordingly, communication with a specific cell may mean communication with an eNB or a node providing communication services to the specific cell. A downlink/uplink signal of a specific cell refers to a downlink/uplink signal from/to an eNB or a node providing communication services to the specific cell. A cell providing uplink/downlink communication services to a UE is called a serving cell. Furthermore, channel status/quality of a specific cell refers to channel status/quality of a channel or a communication link generated between an eNB or a node providing communication services to the specific cell and a UE. In 3GPP LTE-A systems, a UE can measure downlink channel state from a specific node using one or more CSI-RSs (Channel State Information Reference Signals) transmitted through antenna port(s) of the specific node on a CSI-RS resource allocated to the specific node. In general, neighboring nodes transmit CSI-RS resources on orthogonal CSI-RS resources. When CSI-RS resources are orthogonal, this means that the CSI-RS resources have different subframe configurations and/or CSI-RS sequences which specify subframes to which CSI-RSs are allocated according to CSI-RS resource configurations, subframe offsets and transmission periods, etc. which specify symbols and subcarriers carrying the CSI RSs.

In the present invention, PDCCH (Physical Downlink Control Channel)/PCFICH (Physical Control Format Indicator Channel)/PHICH (Physical Hybrid automatic repeat request Indicator Channel)/PDSCH (Physical Downlink Shared Channel) refer to a set of time-frequency resources or resource elements respectively carrying DCI (Downlink Control Information)/CFI (Control Format Indicator)/downlink ACK/NACK (Acknowledgement/Negative ACK)/downlink data. In addition, PUCCH (Physical Uplink Control Channel)/PUSCH (Physical Uplink Shared Channel)/PRACH (Physical Random Access Channel) refer to sets of time-frequency resources or resource elements respectively carrying UCI (Uplink Control Information)/uplink data/random access signals. In the present invention, a time-frequency resource or a resource element (RE), which is allocated to or belongs to PDCCH/PCFICH/PHICH/PDSCH/PUCCH/PUSCH/PRACH, is referred to as a PDCCH/PCFICH/PHICH/PDSCH/PUCCH/PUSCH/PRACH RE or PDCCH/PCFICH/PHICH/PDSCH/PUCCH/PUSCH/PRACH resource. In the following description, transmission of PUCCH/PUSCH/PRACH by a UE is equivalent to transmission of uplink control information/uplink data/random access signal through or on PUCCH/PUSCH/PRACH. Furthermore, transmission of PDCCH/PCFICH/PHICH/PDSCH by an eNB is equivalent to transmission of downlink data/control information through or on PDCCH/PCFICH/PHICH/PDSCH.

FIG. 1 illustrates an exemplary radio frame structure used in a wireless communication system. FIG. 1(a) illustrates a frame structure for frequency division duplex (FDD) used in 3GPP LTE/LTE-A and FIG. 1(b) illustrates a frame structure for time division duplex (TDD) used in 3GPP LTE/LTE-A.

Referring to FIG. 1, a radio frame used in 3GPP LTE/LTE-A has a length of 10 ms (307200 Ts) and includes 10 subframes in equal size. The 10 subframes in the radio frame may be numbered. Here, Ts denotes sampling time and is represented as Ts=1/(2048*15 kHz). Each subframe has a length of 1 ms and includes two slots. 20 slots in the radio frame can be sequentially numbered from 0 to 19. Each slot has a length of 0.5 ms. A time for transmitting a subframe is defined as a transmission time interval (TTI). Time resources can be discriminated by a radio frame number (or radio frame index), subframe number (or subframe index) and a slot number (or slot index).

The radio frame can be configured differently according to duplex mode. Downlink transmission is discriminated from uplink transmission by frequency in FDD mode, and thus the radio frame includes only one of a downlink subframe and an uplink subframe in a specific frequency band. In TDD mode, downlink transmission is discriminated from uplink transmission by time, and thus the radio frame includes both a downlink subframe and an uplink subframe in a specific frequency band.

Table 1 shows DL-UL configurations of subframes in a radio frame in the TDD mode.

TABLE 1

| DL-UL configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |

TABLE 1-continued

| DL-UL configu-ration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes three fields of DwPTS (Downlink Pilot TimeSlot), GP (Guard Period), and UpPTS (Uplink Pilot TimeSlot). DwPTS is a period reserved for downlink transmission and UpPTS is a period reserved for uplink transmission. Table 2 shows special subframe configuration.

TABLE 2

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | 12800 · $T_s$ | | |
| 8 | 24144 · $T_s$ | | | — | — | — |
| 9 | 13168 · $T_s$ | | | — | — | — |

Figure 2:
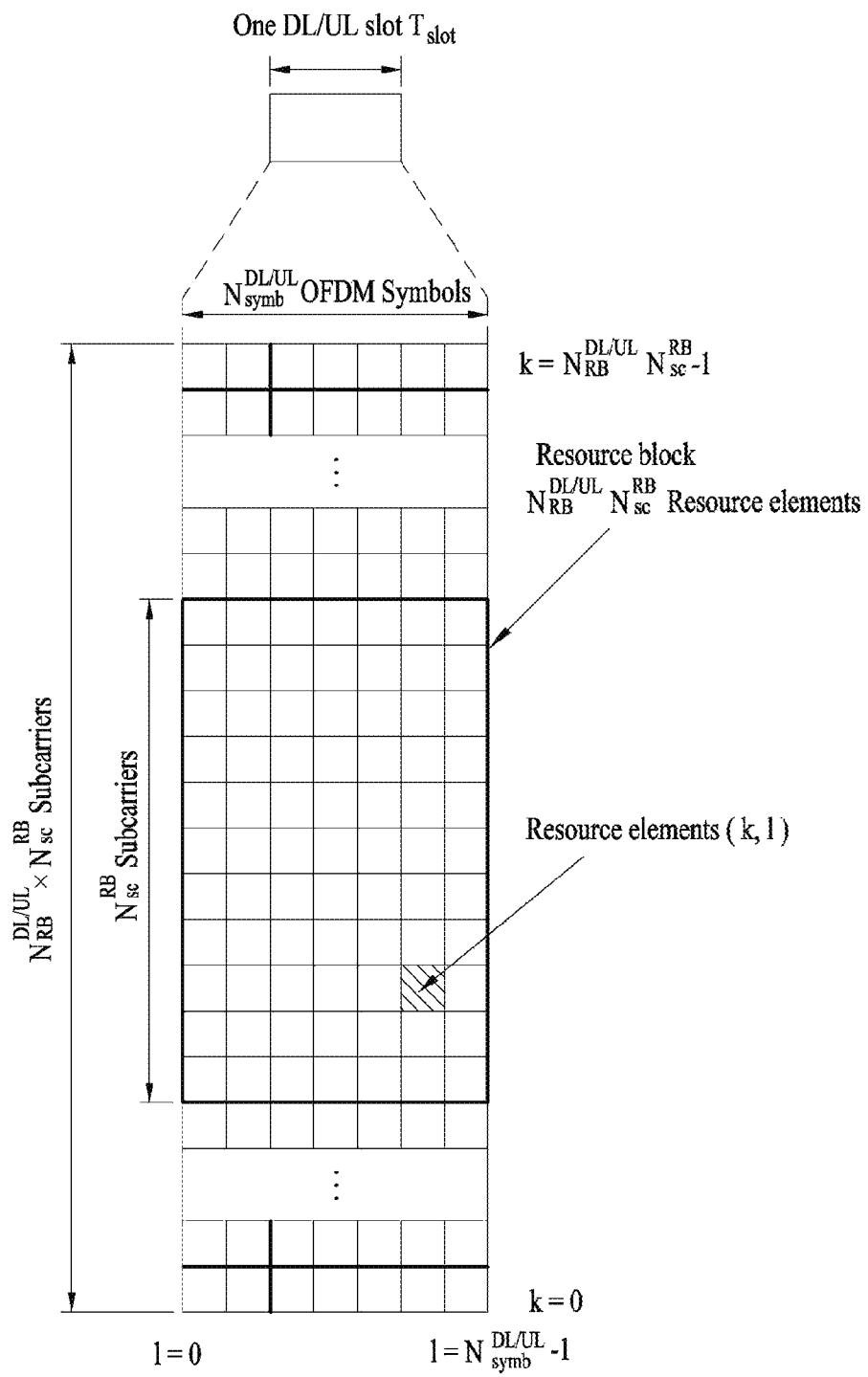
FIG. 2 is a diagram for an example of a downlink (DL)/uplink (UL) slot structure in a wireless communication system.

FIG. 2 illustrates an exemplary downlink/uplink slot structure in a wireless communication system. Particularly, FIG. 2 illustrates a resource grid structure in 3GPP LTE/LTE-A. A resource grid is present per antenna port.

Referring to FIG. 2, a slot includes a plurality of OFDM (Orthogonal Frequency Division Multiplexing) symbols in the time domain and a plurality of resource blocks (RBs) in the frequency domain. An OFDM symbol may refer to a symbol period. A signal transmitted in each slot may be represented by a resource grid composed of $N_{RB}^{DL/UL} * N_{sc}^{RB}$ subcarriers and $N_{symb}^{DL/UL}$ OFDM symbols. Here, $N_{RB}^{DL}$ denotes the number of RBs in a downlink slot and $N_{RB}^{UL}$ denotes the number of RBs in an uplink slot. $N_{RB}^{DL}$ and $N_{RB}^{UL}$ respectively depend on a DL transmission bandwidth and a UL transmission bandwidth. $N_{symb}^{DL}$ denotes the number of OFDM symbols in the downlink slot and $N_{symb}^{UL}$ denotes the number of OFDM symbols in the uplink slot. In addition, $N_{sc}^{RB}$ denotes the number of subcarriers constructing one RB.

An OFDM symbol may be called an SC-FDM (Single Carrier Frequency Division Multiplexing) symbol according to multiple access scheme. The number of OFDM symbols included in a slot may depend on a channel bandwidth and the length of a cyclic prefix (CP). For example, a slot includes 7 OFDM symbols in the case of normal CP and 6 OFDM symbols in the case of extended CP. While FIG. 2 illustrates a subframe in which a slot includes 7 OFDM symbols for convenience, embodiments of the present invention can be equally applied to subframes having different numbers of OFDM symbols. Referring to FIG. 2, each OFDM symbol includes $N_{RB}^{DL/UL} * N_{sc}^{RB}$ subcarriers in the frequency domain. Subcarrier types can be classified into a data subcarrier for data transmission, a reference signal subcarrier for reference signal transmission, and null subcarriers for a guard band and a direct current (DC) component. The null subcarrier for a DC component is a subcarrier remaining unused and is mapped to a carrier frequency (f0) during OFDM signal generation or frequency up-conversion. The carrier frequency is also called a center frequency.

An RB is defined by $N_{symb}^{DL/UL}$ (e.g., 7) consecutive OFDM symbols in the time domain and $N_{sc}^{RB}$ (e.g., 12) consecutive subcarriers in the frequency domain. For reference, a resource composed by an OFDM symbol and a subcarrier is called a resource element (RE) or a tone. Accordingly, an RB is composed of $N_{symb}^{DL/UL} * N_{sc}^{RB}$ REs. Each RE in a resource grid can be uniquely defined by an index pair (k, l) in a slot. Here, k is an index in the range of 0 to $N_{symb}^{DL/UL} * N_{sc}^{RB} - 1$ in the frequency domain and l is an index in the range of 0 to $N_{symb}^{DL/UL} - 1$.

Two RBs that occupy $N_{sc}^{RB}$ consecutive subcarriers in a subframe and respectively disposed in two slots of the subframe are called a physical resource block (PRB) pair. Two RBs constituting a PRB pair have the same PRB number (or PRB index). A virtual resource block (VRB) is a logical resource allocation unit for resource allocation. The VRB has the same size as that of the PRB. The VRB may be divided into a localized VRB and a distributed VRB depending on a mapping scheme of VRB into PRB. The localized VRBs are mapped into the PRBs, whereby VRB number (VRB index) corresponds to PRB number. That is, nPRB=nVRB is obtained. Numbers are given to the localized VRBs from 0 to $N_{VRB}^{DL}-1$, and $N_{VRB}^{DL}=N_{RB}^{DL}$ is obtained. Accordingly, according to the localized mapping scheme, the VRBs having the same VRB number are mapped into the PRBs having the same PRB number at the first slot and the second slot. On the other hand, the distributed VRBs are mapped into the PRBs through interleaving. Accordingly, the VRBs having the same VRB number may be mapped into the PRBs having different PRB numbers at the first slot and the second slot. Two PRBs, which are respectively located at two slots of the subframe and have the same VRB number, will be referred to as a pair of VRBs.

Figure 3:
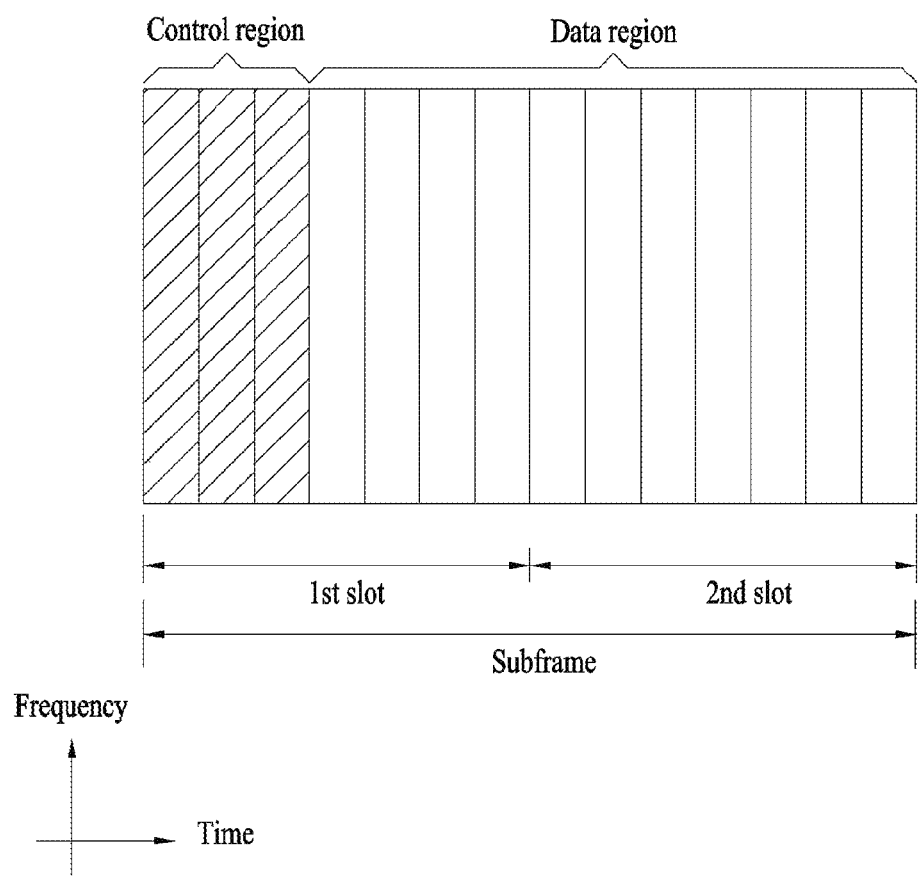
FIG. 3 is a diagram for an example of a downlink (DL) subframe structure used in 3GPP LTE/LTE-A system.

FIG. 3 illustrates a downlink (DL) subframe structure used in 3GPP LTE/LTE-A.

Referring to FIG. 3, a DL subframe is divided into a control region and a data region. A maximum of three (four)

OFDM symbols located in a front portion of a first slot within a subframe correspond to the control region to which a control channel is allocated. A resource region available for PDCCH transmission in the DL subframe is referred to as a PDCCH region hereinafter. The remaining OFDM symbols correspond to the data region to which a physical downlink shared chancel (PDSCH) is allocated. A resource region available for PDSCH transmission in the DL subframe is referred to as a PDSCH region hereinafter. Examples of downlink control channels used in 3GPP LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative acknowledgment (NACK) signal.

Control information carried on the PDCCH is called downlink control information (DCI). The DCI contains resource allocation information and control information for a UE or a UE group. For example, the DCI includes a transport format and resource allocation information of a downlink shared channel (DL-SCH), a transport format and resource allocation information of an uplink shared channel (UL-SCH), paging information of a paging channel (PCH), system information on the DL-SCH, information about resource allocation of an upper layer control message such as a random access response transmitted on the PDSCH, a transmit control command set with respect to individual UEs in a UE group, a transmit power control command, information on activation of a voice over IP (VoIP), downlink assignment index (DAI), etc. The transport format and resource allocation information of the DL-SCH are also called DL scheduling information or a DL grant and the transport format and resource allocation information of the UL-SCH are also called UL scheduling information or a UL grant. The size and purpose of DCI carried on a PDCCH depend on DCI format and the size thereof may be varied according to coding rate. Various formats, for example, formats 0 and 4 for uplink and formats 1, 1A, 1B, 1C, 1D, 2, 2A, 2B, 2C, 3 and 3A for downlink, have been defined in 3GPP LTE. Control information such as a hopping flag, information on RB allocation, modulation coding scheme (MCS), redundancy version (RV), new data indicator (NDI), information on transmit power control (TPC), cyclic shift demodulation reference signal (DMRS), UL index, channel quality information (CQI) request, DL assignment index, HARQ process number, transmitted precoding matrix indicator (TPMI), precoding matrix indicator (PMI), etc. is selected and combined based on DCI format and transmitted to a UE as DCI.

In general, a DCI format for a UE depends on transmission mode (TM) set for the UE. In other words, only a DCI format corresponding to a specific TM can be used for a UE configured in the specific TM.

A PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). For example, a CCE corresponds to 9 REGs and an REG corresponds to 4 REs. 3GPP LTE defines a CCE set in which a PDCCH can be located for each UE. A CCE set from which a UE can detect a PDCCH thereof is called a PDCCH search space, simply, search space. An individual resource through which the PDCCH can be transmitted within the search space is called a PDCCH candidate. A set of PDCCH candidates to be monitored by the UE is defined as the search space. In 3GPP LTE/LTE-A, search spaces for DCI formats may have different sizes and include a dedicated search space and a common search space. The dedicated search space is a UE-specific search space and is configured for each UE. The common search space is configured for a plurality of UEs. Aggregation levels defining the search space is as follows.

TABLE 3

| | Search Space | | |
|---|---|---|---|
| Type | Aggregation Level L | Size [in CCEs] | Number of PDCCH candidates $M^{(L)}$ |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

A PDCCH candidate corresponds to 1, 2, 4 or 8 CCEs according to CCE aggregation level. An eNB transmits a PDCCH (DCI) on an arbitrary PDCCH candidate with in a search space and a UE monitors the search space to detect the PDCCH (DCI). Here, monitoring refers to attempting to decode each PDCCH in the corresponding search space according to all monitored DCI formats. The UE can detect the PDCCH thereof by monitoring plural PDCCHs. Since the UE does not know the position in which the PDCCH thereof is transmitted, the UE attempts to decode all PDCCHs of the corresponding DCI format for each subframe until a PDCCH having the ID thereof is detected. This process is called blind detection (or blind decoding (BD)).

The eNB can transmit data for a UE or a UE group through the data region. Data transmitted through the data region may be called user data. For transmission of the user data, a physical downlink shared channel (PDSCH) may be allocated to the data region. A paging channel (PCH) and downlink-shared channel (DL-SCH) are transmitted through the PDSCH. The UE can read data transmitted through the PDSCH by decoding control information transmitted through a PDCCH. Information representing a UE or a UE group to which data on the PDSCH is transmitted, how the UE or UE group receives and decodes the PDSCH data, etc. is included in the PDCCH and transmitted. For example, if a specific PDCCH is CRC (cyclic redundancy check)-masked having radio network temporary identify (RNTI) of "A" and information about data transmitted using a radio resource (e.g., frequency position) of "B" and transmission format information (e.g., transport block size, modulation scheme, coding information, etc.) of "C" is transmitted through a specific DL subframe, the UE monitors PDCCHs using RNTI information and a UE having the RNTI of "A" detects a PDCCH and receives a PDSCH indicated by "B" and "C" using information about the PDCCH.

A reference signal (RS) to be compared with a data signal is necessary for the UE to demodulate a signal received from the eNB. A reference signal refers to a predetermined signal having a specific waveform, which is transmitted from the eNB to the UE or from the UE to the eNB and known to both the eNB and UE. The reference signal is also called a pilot. Reference signals are categorized into a cell-specific RS shared by all UEs in a cell and a modulation RS (DM RS) dedicated for a specific UE. A DM RS transmitted by the eNB for demodulation of downlink data for a specific UE is called a UE-specific RS. Both or one of DM RS and CRS may be transmitted on downlink. When only the DM RS is transmitted without CRS, an RS for channel measurement needs to be additionally provided because the DM RS transmitted using the same precoder as used for data can be used for demodulation only. For example, in 3GPP LTE(-A), CSI-RS corresponding to an additional RS for measurement is transmitted to the UE such that the UE can measure channel state information. CSI-RS is transmitted in each transmission period corresponding to a plurality of subframes based on the fact that channel state variation with time is not large, unlike CRS transmitted per subframe.

Figure 4:
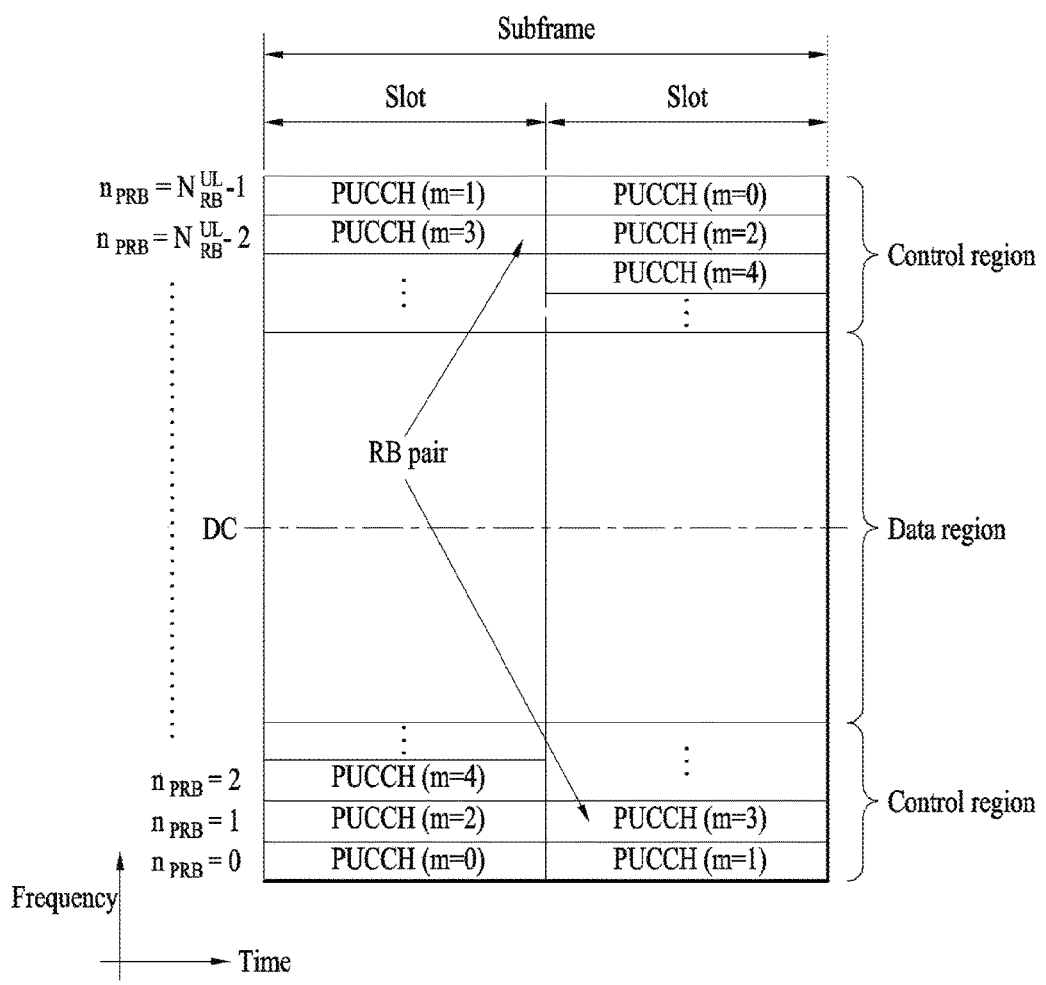
FIG. 4 is a diagram for an example of an uplink (UL) subframe structure used in 3GPP LTE/LTE-A system.

FIG. 4 illustrates an exemplary uplink subframe structure used in 3GPP LTE/LTE-A.

Referring to FIG. 4, a UL subframe can be divided into a control region and a data region in the frequency domain. One or more PUCCHs (physical uplink control channels) can be allocated to the control region to carry uplink control information (UCI). One or more PUSCHs (Physical uplink shared channels) may be allocated to the data region of the UL subframe to carry user data.

In the UL subframe, subcarriers spaced apart from a DC subcarrier are used as the control region. In other words, subcarriers corresponding to both ends of a UL transmission bandwidth are assigned to UCI transmission. The DC subcarrier is a component remaining unused for signal transmission and is mapped to the carrier frequency f0 during frequency up-conversion. A PUCCH for a UE is allocated to an RB pair belonging to resources operating at a carrier frequency and RBs belonging to the RB pair occupy different subcarriers in two slots. Assignment of the PUCCH in this manner is represented as frequency hopping of an RB pair allocated to the PUCCH at a slot boundary. When frequency hopping is not applied, the RB pair occupies the same subcarrier.

The PUCCH can be used to transmit the following control information.

Scheduling Request (SR): This is information used to request a UL-SCH resource and is transmitted using On-Off Keying (OOK) scheme.

HARQ ACK/NACK: This is a response signal to a downlink data packet on a PDSCH and indicates whether the downlink data packet has been successfully received. A 1-bit ACK/NACK signal is transmitted as a response to a single downlink codeword and a 2-bit ACK/NACK signal is transmitted as a response to two downlink codewords. HARQ-ACK responses include positive ACK (ACK), negative ACK (NACK), discontinuous transmission (DTX) and NACK/DTX. Here, the term HARQ-ACK is used interchangeably with the term HARQ ACK/NACK and ACK/NACK.

Channel State Indicator (CSI): This is feedback information about a downlink channel. Feedback information regarding MIMO includes a rank indicator (RI) and a precoding matrix indicator (PMI).

The quantity of control information (UCI) that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In the case of a subframe in which a sounding reference signal (SRS) is configured, the last SC-FDMA symbol of the subframe is excluded from the SC-FDMA symbols available for control information transmission. A reference signal is used to detect coherence of the PUCCH. The PUCCH supports various formats according to information transmitted thereon.

Table 4 shows the mapping relationship between PUCCH formats and UCI in LTE/LTE-A.

TABLE 4

| PUCCH format | Modulation scheme | Number of bits per subframe, $M_{bit}$ | Usage | Etc. |
| --- | --- | --- | --- | --- |
| 1 | N/A | N/A | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codeword |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK or SR + ACK/NACK or CQI/PMI/RI + ACK/NACK | |

Referring to Table 4, PUCCH formats 1/1a/1b are used to transmit ACK/NACK information, PUCCH format 2/2a/2b are used to carry CSI such as CQI/PMFRI and PUCCH format 3 is used to transmit ACK/NACK information.

Reference Signal (RS)

When a packet is transmitted in a wireless communication system, signal distortion may occur during transmission since the packet is transmitted through a radio channel. To correctly receive a distorted signal at a receiver, the distorted signal needs to be corrected using channel information. To detect channel information, a signal known to both a transmitter and the receiver is transmitted and channel information is detected with a degree of distortion of the signal when the signal is received through a channel. This signal is called a pilot signal or a reference signal.

When data is transmitted/received using multiple antennas, the receiver can receive a correct signal only when the receiver is aware of a channel state between each transmit antenna and each receive antenna. Accordingly, a reference signal needs to be provided per transmit antenna, more specifically, per antenna port.

Reference signals can be classified into an uplink reference signal and a downlink reference signal. In LTE, the uplink reference signal includes:

i) a demodulation reference signal (DMRS) for channel estimation for coherent demodulation of information transmitted through a PUSCH and a PUCCH; and ii) a sounding reference signal (SRS) used for an eNB to measure uplink channel quality at a frequency of a different network.

The downlink reference signal includes:

i) a cell-specific reference signal (CRS) shared by all UEs in a cell;

ii) a UE-specific reference signal for a specific UE only;

iii) a DMRS transmitted for coherent demodulation when a PDSCH is transmitted;

iv) a channel state information reference signal (CSI-RS) for delivering channel state information (CSI) when a downlink DMRS is transmitted;

v) a multimedia broadcast single frequency network (MBSFN) reference signal transmitted for coherent demodulation of a signal transmitted in MBSFN mode; and vi) a positioning reference signal used to estimate geographic position information of a UE.

Reference signals can be classified into a reference signal for channel information acquisition and a reference signal for data demodulation. The former needs to be transmitted in a wide band as it is used for a UE to acquire channel information on downlink transmission and received by a UE even if the UE does not receive downlink data in a specific subframe. This reference signal is used even in a handover situation. The latter is transmitted along with a corresponding resource by an eNB when the eNB transmits a downlink signal and is used for a UE to demodulate data through channel measurement. This reference signal needs to be transmitted in a region in which data is transmitted.

Carrier Aggregation (CA)

Figure 6:
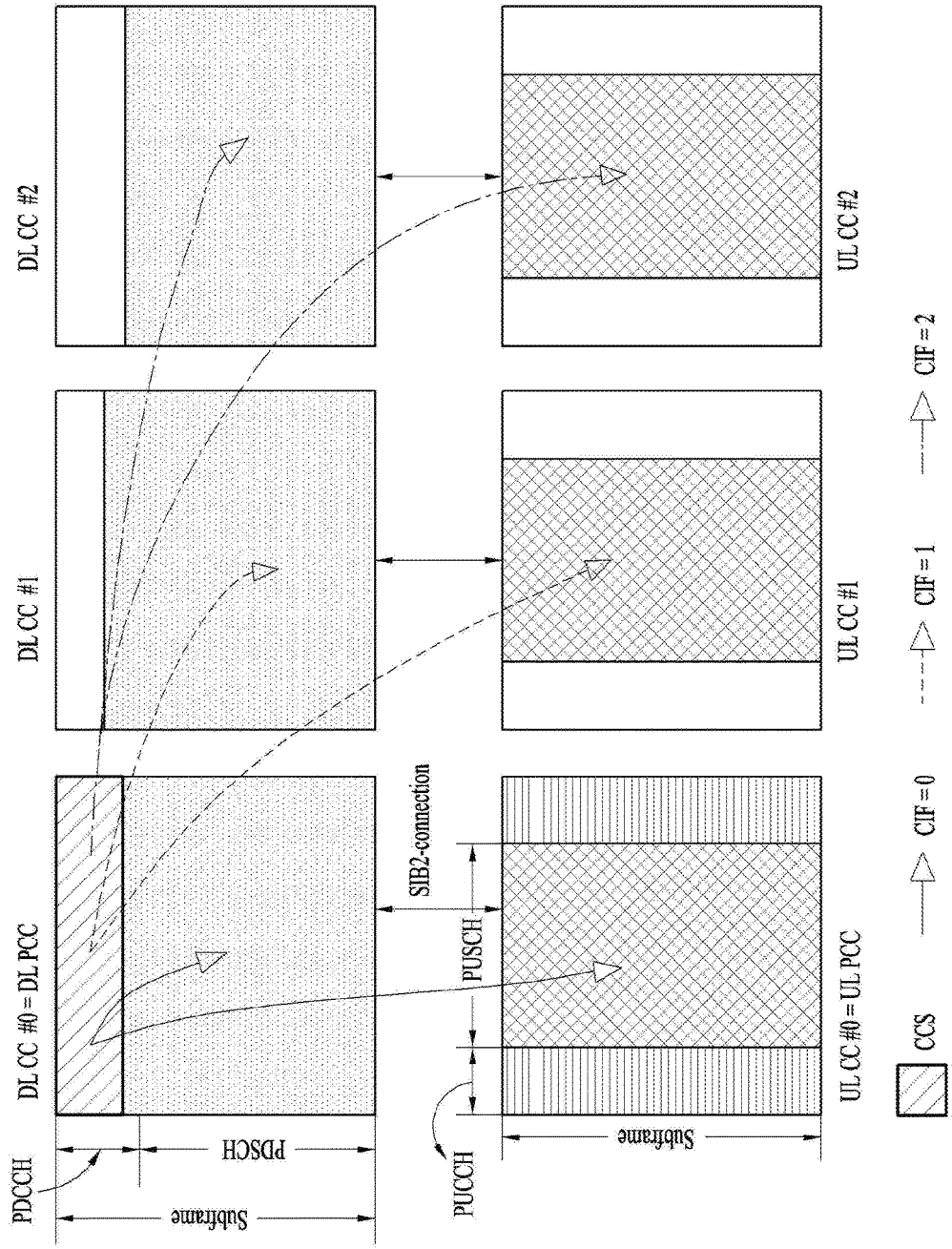
FIG. 6 is a diagram for cross scheduling used in 3GPP LTE/LTE-A system.

Carrier aggregation will hereinafter be described in detail. FIG. 6 is a conceptual diagram illustrating carrier aggregation (CA).

Carrier aggregation refers to a method for allowing a UE to use a plurality of frequency blocks or (logical) cells, each of which is composed of uplink resources (or CCs) and/or downlink resources (or CCs), as one large logical band so as to provide a wireless communication system with a wider frequency bandwidth. For convenience of description and better understanding of the present invention, carrier aggregation will hereinafter be referred to as a component carrier (CC).

Figure 5:
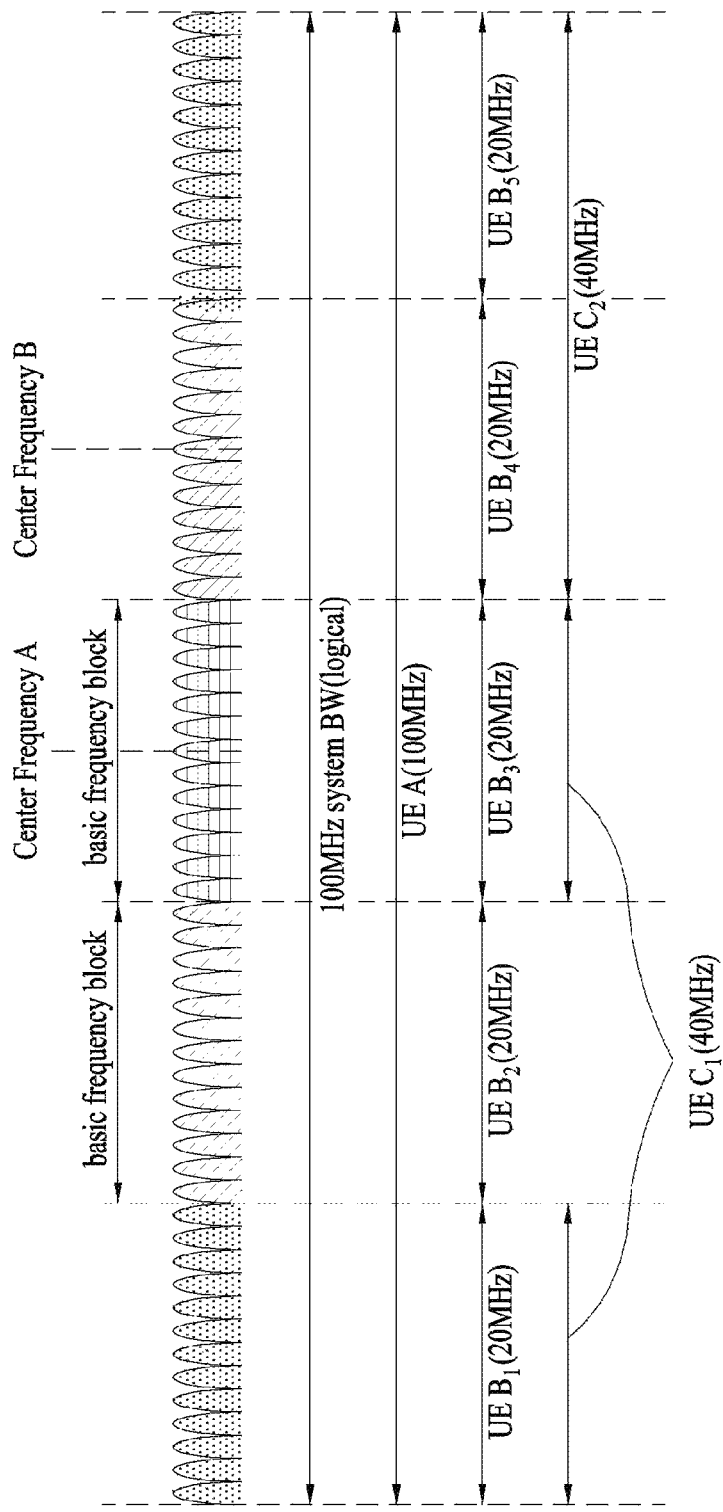
FIG. 5 is a diagram for a carrier used in 3GPP LTE/LTE-A system.

Referring to FIG. 5, the entire system bandwidth (System BW) includes a bandwidth of 100 MHz as a logical bandwidth. The entire system bandwidth (system BW) includes five component carriers (CCs) and each CC has a maximum bandwidth of 20 MHz. The CC includes one or more physically contiguous subcarriers. Although all CCs have the same bandwidth in FIG. 6, this is only exemplary and the CCs may have different bandwidths. Although the CCs are shown as being contiguous in the frequency domain in FIG. 6, FIG. 6 merely shows the logical concept and thus the CCs may be physically contiguous or separated.

Different center frequencies may be used for the CCs or one common center frequency may be used for physically contiguous CCs. For example, in FIG. 6, if it is assumed that all CCs are physically contiguous, a center frequency A may be used. If it is assumed that CCs are not physically contiguous, a center frequency A, a center frequency B and the like may be used for the respective CCs.

In the present specification, the CC may correspond to a system band of a legacy system. By defining the CC based on the legacy system, it is possible to facilitate backward compatibility and system design in a radio communication environment in which an evolved UE and a legacy UE coexist. For example, if the LTE-A system supports carrier aggregation, each CC may correspond to the system band of the LTE system. In this case, the CC may have any one bandwidth such as 1.25, 2.5, 5, 10 or 20 MHz.

In the case in which the entire system band is extended by carrier aggregation, a frequency band used for communication with each UE is defined in CC units. A UE A may use 100 MHz which is the bandwidth of the entire system band and perform communication using all five CCs. Each of UEs B1 to B5 may only use a bandwidth of 20 MHz and perform communication using one CC. Each of UEs C1 and C2 may use a bandwidth of 40 MHz and perform communication using two CCs. The two CCs may be contiguous or non-contiguous. The UE C1 uses two non-contiguous CCs and the UE C2 uses two contiguous CCs.

One downlink CC and one uplink CC may be used in the LTE system and several CCs may be used in the LTE-A system. At this time, a method of scheduling a data channel by a control channel may be divided into a linked carrier scheduling method and a cross carrier scheduling method.

More specifically, in the linked carrier scheduling method, similarly to the LTE system using a single CC, a control channel transmitted via a specific CC schedules only a data channel via the specific CC.

In contrast, in the cross carrier scheduling method, a control channel transmitted via a primary CC using a carrier indicator field (CIF) schedules a data channel transmitted via the primary CC or another CC.

FIG. 6 is a conceptual diagram of a cross carrier scheduling scheme. Specifically, as can be seen from FIG. 6, the number of cells (or CCs) allocated to a relay node (RN) is set to 3, cross carrier scheduling is carried out using a CIF as described above. In this case, it is assumed that a downlink cell (or CC) #0 and a uplink cell (or CC) #0 is set to a primary downlink CC (i.e., a primary cell PCell) and a primary uplink downlink CC, and the remaining CCs are used as secondary cells (S Cells).

Figure 7:
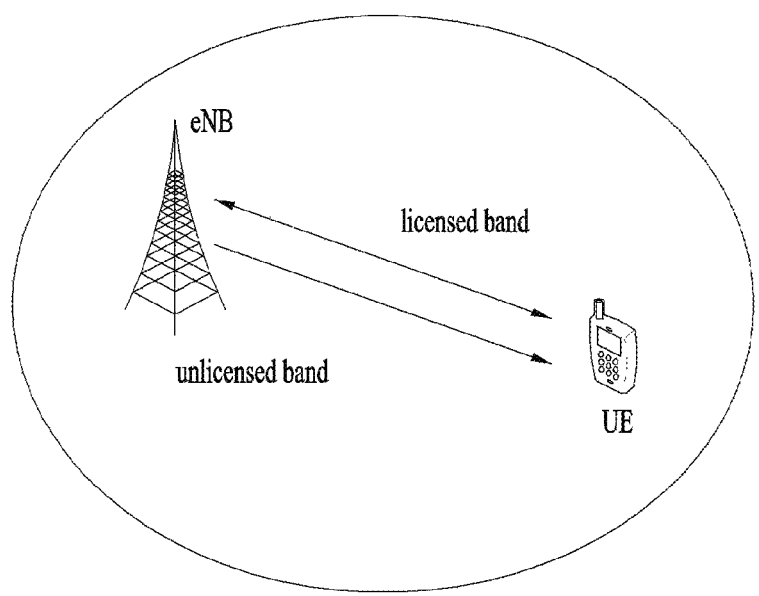
FIG. 7 is a diagram for a carrier aggregation system using an unlicensed band as a secondary carrier.

The present invention proposes a method for both a transmitter and a receiver to sense an unlicensed band and check whether or not the band is idle, a method for an eNB to transmit PDSCH, and a method for a UE to transmit PUSCH in a situation that a signal is transmitted and received through a carrier of an unlicensed band of which a dominant use of a specific system is not guaranteed. As an example, as shown in FIG. 7, when carrier aggregation is performed on LTE-A band corresponding to a licensed band and LTE-A band corresponding to an unlicensed band, an eNB may transmit a signal to a UE or the UE may transmit a signal to the eNB.

In the following, for clarity of explanation of the proposed scheme, assume that a UE is configured to perform wireless communication via two component carriers in a licensed band and an unlicensed band, respectively. In this case, as an example, a carrier of the licensed band can be referred to as a primary component carrier (PCC or PCell) and a carrier of the unlicensed band can be referred to as a unlicensed secondary component carrier (USCC or UScell). Yet, schemes proposed in the present invention can be extensively applied to a case that a plurality of licensed bands and a plurality of unlicensed bands are used via a carrier aggregation scheme. And, the schemes can also be applied to a case that a signal is transceived between an eNB and a UE using an unlicensed band only. And, the schemes proposed by the present invention can be applied not only to 3GPP LTE system but also to a system having a different characteristic.

In a next generation system, in order to efficiently use a frequency band, discussion on a method of utilizing an unlicensed band such as 2.4 GHz band mainly used by WiFi system or a newly rising unlicensed band such as 5 GHz band for traffic offloading is in progress. Unlike a basic licensed band, since an unlicensed band basically assumes a scheme of having wireless transmission and reception opportunity via contention between communication nodes, it is required for each communication node to perform such a work as channel sensing before a signal is transmitted to check whether or not a signal is transmitted to a different communication node. For clarity, the above-mentioned operation is referred to as LBT (listen before talk). In particular, the operation of checking whether or not a different node transmits a signal is defined as CS (carrier sensing) and a case of determining that the different node does not transmit a signal is defined as CCA (clear channel assessment) is checked. In LTE system, it is necessary for an eNB or a UE to perform the LBT to transmit a signal on an unlicensed band (for clarity, LTE-U band). When the eNB or the UE transmits a signal, it is also necessary for other communication nodes such as WiFi and the like to perform the LBT to prevent interference.

PDSCH Transmission Procedure 1

Figure 8:
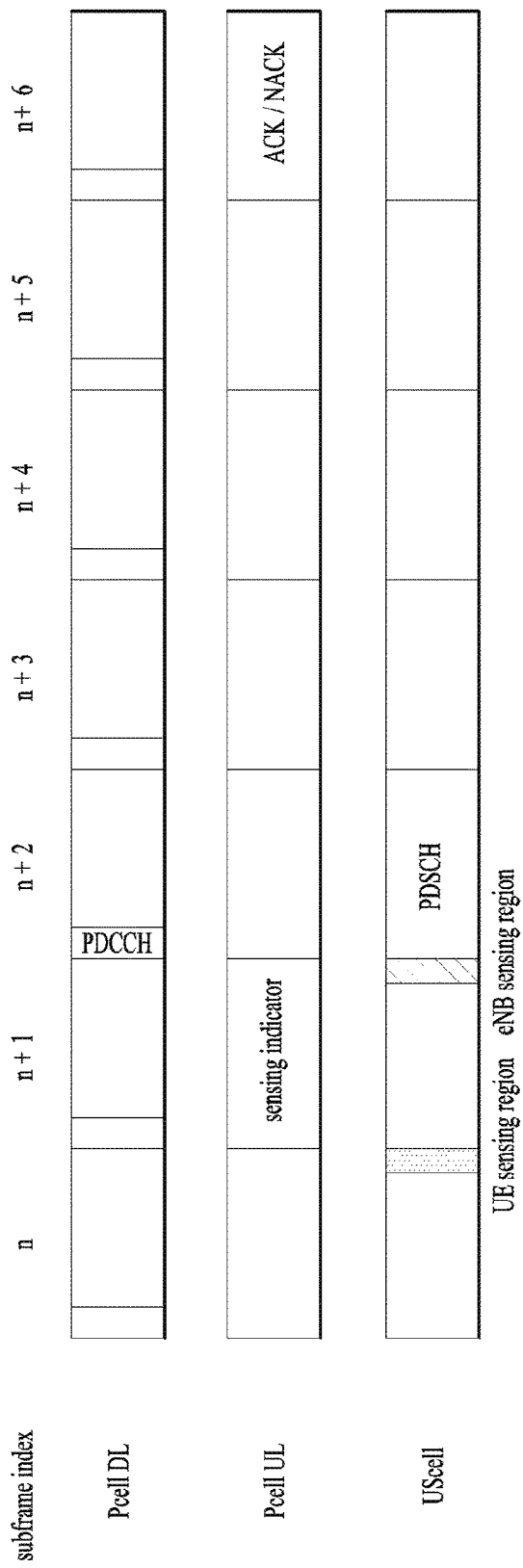
FIG. 8 is a diagram for a procedure according to one embodiment of the present invention.

In this chapter, a PDSCH transmission procedure of an eNB in an UScell is proposed. According to the proposed procedure, a UE performs channel sensing on the US cell and reports a result of the channel sensing to the eNB. The eNB determines whether to transmit PDSCH to the UE in the UScell based on the result of the channel sensing reported by the UE. FIG. 8 shows an embodiment of the PDSCH transmission procedure. The UE performs sensing on the US cell during a partial time section of an SF n and reports a sensing indicator corresponding to a result of the sensing to the eNB in an SF n+1 via a Pcell UL resource. The eNB performs sensing on the UScell during a partial time section of the SF n+1 and determines whether or not a channel is in an idle state. The eNB transmits PDSCH to the UE in an SF n+2 in the UScell only when the sensing result of the UE is reported as the idle state via the sensing indicator and the sensing result of the eNB measured on the UScell is in an idle state. In particular, according to the proposed procedure, a prerequisite for the eNB to transmit PDSCH in the UScell is to determine both the report on the result of sensing the UScell, which is recently sensed at a location of the UE corresponding to a receiver, and the result of sensing the UScell, which is sensed at a location of the eNB corresponding to a transmitter immediately before the PDSCH is transmitted, as the idle state. If a sensing result of one side is determined as busy, the eNB gives up the PDSCH transmission in the UScell.

In this case, in order for the UE to perform sensing on the UScell and determine whether a channel is idle or busy, it may use one of methods described in the following.

The UE measures reception power of the entire reception signals and compares the measured reception power with a threshold. If the reception power is equal to or greater (or exceeds) than the threshold, it may determine that the channel is busy. Otherwise, it may determine that the channel is idle. In this case, the threshold can be determined in advance or can be configured by the eNB via higher layer signaling.

The UE compares an increment of interference amount at the time of sensing in contrast with interference amount, which is measured to calculate the lastly reported CSI prior to x[m], with a threshold. If the increment is equal to or greater (or exceeds) than the threshold, it may determine that the channel is busy. Otherwise, it may determine that the channel is idle.

In this case, in order for the eNB to perform sensing on the UScell and determine whether a channel is idle or busy, it may use one of methods described in the following.

The eNB measures reception power of the entire reception signals and compares the measured reception power with a threshold. If the reception power is equal to or greater (or exceeds) than the threshold, it may determine that the channel is busy. Otherwise, it may determine that the channel is idle.

The eNB compares an increment of interference amount at the time of sensing in contrast with interference amount, which is measured at the timing of receiving CQI report lastly reported from a UE to be scheduled by the eNB, with a threshold. If the increment is equal to or greater (or exceeds) than the threshold, it may determine that the channel is busy. Otherwise, it may determine that the channel is idle.

When the UE reports a sensed result of the UScell to the eNB, it may use a reporting scheme described in the following irrespective of whether or not PDSCH is scheduled.

The eNB can configure the UE to report a sensing indicator with a periodic interval via higher layer signaling. In this case, it may be able to configure a reporting period of the sensing indicator as well. The reporting period of the sensing indicator can be configured by every subframe or an integer multiple of a subframe.

The eNB can trigger the UE to report a sensing indicator in every subframe during prescribed subframes by transmitting DCI to the UE via PDCCH. In this case, the eNB can also trigger the UE to report a sensing indicator one time only by transmitting DCI to the UE via PDCCH.

In the foregoing description, the second reporting scheme is efficient only when there is possibility that UScell PDSCH is scheduled to the UE, because the second reporting scheme triggers a result sensed during specific time to be reported. However, since DCI is used for triggering, the scheme has overhead.

The UE reports a result sensed on the UScell to the eNB using a UL channel of a Pcell. The UL channel is referred to as a sensing indicator channel. A structure of the sensing indicator channel can be configured by one of various methods descried in the following using structures of UL channels in legacy LTE system.

PUCCH format 1 (SR channel structure): If the sensed result corresponds to busy, the UE transmits PUCCH. Otherwise, the UE may not transmit PUCCH. In particular, the UE transmits the PUCCH to the eNB as a busy indicator to terminate UScell PDSCH transmission of the eNB.

PUCCH format 1 (SR channel structure): If the sensed result corresponds to idle, the UE transmits PUCCH. Otherwise, the UE may not transmit PUCCH. In particular, the UE transmits the PUCCH to the eNB as an idle indicator to inform the eNB that UScell PDSCH transmission of the eNB is available.

PUCCH format 1a (1-bit ACK/NACK channel): selects whether the sensed result corresponds to idle or busy to make a report.

PUCCH format 1b (2-bit ACK/NACK channel): selects one from among idle, low idle, medium busy, and high busy to make a report.

SRS channel: If the sensed result corresponds to busy, the UE transmits SRS. Otherwise, the UE may not transmit SRS. In particular, the UE transmits the SRS to the eNB as a busy indicator to terminate UScell PDSCH transmission of the eNB.

SRS channel: If the sensed result corresponds to idle, the UE transmits SRS. Otherwise, the UE may not transmit SRS. In particular, the UE transmits the SRS to the eNB as an idle indicator to inform the eNB that UScell PDSCH transmission of the eNB is available.

Two SRS channels: If the sensed result corresponds to idle, the UE transmits SRS1 channel. Otherwise, the UE may transmit SRS2 channel.

The sensing indicator channel is used to check whether or not the UE to which PDSCH is to be scheduled is in high interference environment in a manner that an individual resource is allocated to each UE.

On the contrary, if the sensing indicator channel is configured by a structure of a busy indicator, the eNB can assign a common sensing indicator channel to all UEs belonging to a cell region. In this case, if a result sensed by one of the UEs to which the common sensing indicator channel is assigned corresponds to busy, the UE transmits a busy indicator. According to the scheme, although the eNB does not know which channel of a UE is busy, if PDSCH is transmitted to the UScell, it may cause potential interference to a different system of a certain location. Hence, the scheme is appropriate for a resource allocation scheme of a sensing indicator channel in case of a passive UScell PDSCH scheduling scheme that the PDSCH transmission to the UScell is abandoned.

According to the proposed scheme, when a sensing indicator channel is transmitted in a PUCCH format, if a different channel is transmitted in Pcell UL in a corresponding subframe, a sensing indicator is transmitted in a manner of being multiplexed with the channel.

PDSCH Transmission Procedure 2-1, Reactive CCA

According to a scheme proposed in the present chapter, the eNB performs channel sensing on the UScell to check whether or not a channel is idle and transmits PDCCH to a target UE via Pcell. The PDCCH includes scheduling information of PDSCH to be transmitted later, representative transmission frequency resource information, MCS information, HARQ-related information, and target reception UE ID information. Having received the PDCCH, the target UE performs channel sensing on the UScell and reports a result of the channel sensing to the eNB. The eNB determines whether to transmit PDSCH corresponding to the PDCCH previously transmitted to the UE in the UScell based on the sensing result reported by the target UE.

Figure 9:
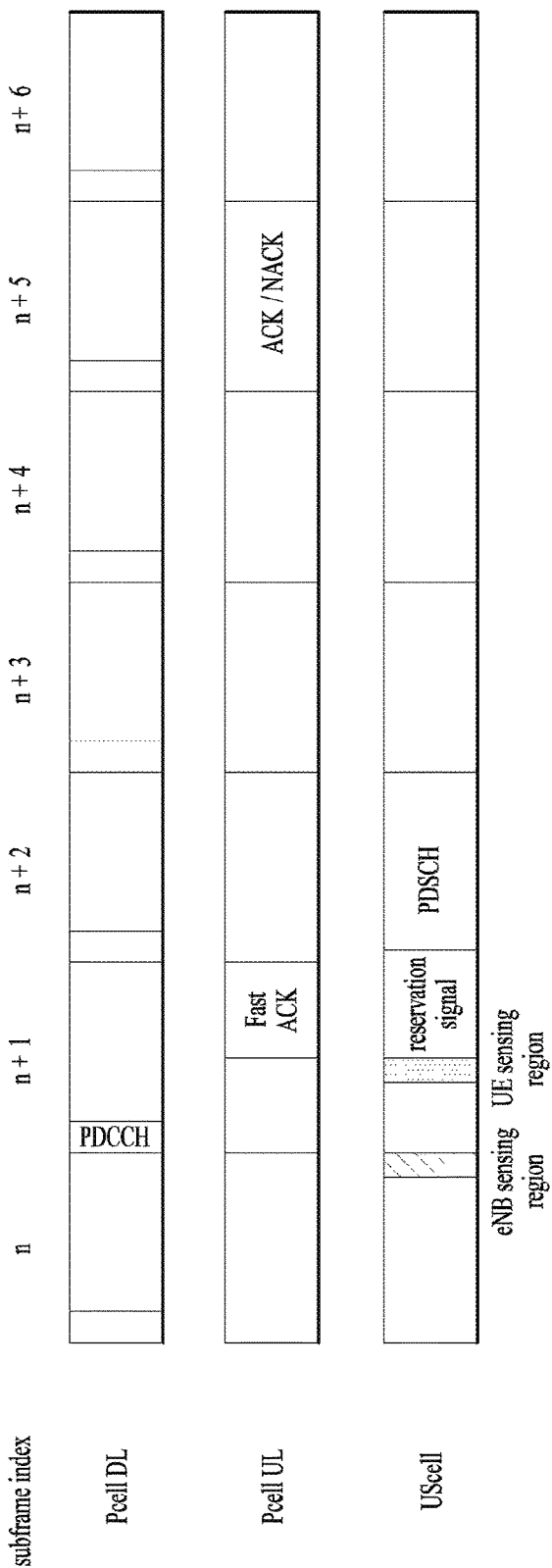
FIG. 9 is a diagram for a procedure according to one embodiment of the present invention.

FIG. 9 shows an embodiment of the present invention. The eNB performs channel sensing on the UScell during a partial time section of an SF n. If it is determined that a channel is idle, the eNB transmits PDCCH to a target UE in an SF n+1. Having received the PDCCH, the target UE performs channel sensing on the UScell during a partial time section of the same SF n+1 and reports a result of the channel sensing to the eNB. If the reported sensing result corresponds to idle, the eNB transmits PDSCH corresponding to the PDCCH, which is transmitted to the UE in the SF n+1, to the UE in an SF n+2 in the UScell.

In particular, according to the proposed scheme, a prerequisite for the eNB to transmit PDSCH is to determine both the result of sensing the US cell, which is sensed at a location of the eNB corresponding to a transmitter immediately before the PDCCH is transmitted, and the report on the result of sensing the UScell, which is recently sensed at a location of the UE corresponding to a receiver, as the idle state. In this case, the eNB transmits PDSCH in the UScell. According to the proposed scheme, the eNB separates a control channel from a data channel and transmits the control channel and the data channel with a time interval. The control channel transmitted by the eNB plays a role in triggering channel sensing of the UE. The data channel can be transmitted only when a result of the channel sensing performed by the UE is reported as idle. If the result of the channel sensing performed by the UE is reported as busy, the eNB gives up PDSCH transmission in the UScell.

In this case, in order for the eNB to perform channel sensing on the UScell and determine whether or not a channel is idle or busy, it may be able to use one of methods described in the following.

The eNB measures reception power of the entire reception signals and compares the measured reception power with a threshold. If the reception power is equal to or greater (or exceeds) than the threshold, it may determine that the channel is busy. Otherwise, it may determine that the channel is idle.

The eNB compares an increment of interference amount at the time of sensing in contrast with interference amount, which is measured at the timing of receiving CQI report lastly reported from the UE to be scheduled by the eNB, with a threshold. If the increment is equal to or greater (or exceeds) than the threshold, it may determine that the channel is busy. Otherwise, it may determine that the channel is idle.

In this case, in order for the UE to perform channel sensing on the UScell and determine whether or not a channel is idle or busy, it may be able to use one of methods described in the following.

The UE measures reception power of the entire reception signals and compares the measured reception power with a threshold. If the reception power is equal to or greater (or exceeds) than the threshold, it may determine that the channel is busy. Otherwise, it may determine that the channel is idle. In this case, the threshold can be determined in advance or can be configured by the eNB via higher layer signaling.

The UE calculates expected FER when data of MCS designated to PDCCH is received in environment of interference amount at the timing of sensing. If the expected FER is higher than a target FER, it may determine that the channel is busy. Otherwise, it may determine that the channel is idle. In this case, the target FER can be determined in advance or can be configured by the eNB via higher layer signaling.

The UE compares an increment of interference amount at the time of sensing in contrast with interference amount, which is measured to calculate the lastly reported CSI prior to x[m], with a threshold. If the increment is equal to or greater (or exceeds) than the threshold, it may determine that the channel is busy. Otherwise, it may determine that the channel is idle.

In this case, when the UE senses the UScell, it may be able to use a scheme of measuring an interference amount on a frequency resource designated by PDCCH only. The frequency resource designated for sensing can be designated by a resource for transmitting data.

A sensing result for the UScell sensed by the UE is reported using a UL channel of the Pcell. The channel can be referred to as a sensing indicator channel or a fast ACK/NACK channel depending on a method of determining the sensing result. In particular, a scheme of reporting on whether or not MCS data designated to PDCCH is received in measured interference environment can be considered as a scheme of quickly reporting virtual ACK or NACK in advance.

According to the proposed scheme, since there is a time difference between a timing of sensing the UScell sensed by the UE to transmit a fast ACK indicator and a timing of receiving PDSCH, the UE transmits a reservation signal to the UScell to prevent an interference node from starting transmission between the timings. The transmission of the reservation signal has a meaning identical to the fast ACK transmitted in Pcell UL. In particular, if the eNB is able to identify the reservation signal transmitted by the UE, the eNB detects the reservation signal and may be able to additionally check that the UE has reported the fast ACK.

In order to transmit a fast ACK indicator, sensing is performed on the UScell. If a channel is determined as idle, the reservation signal is transmitted until timing that the UE starts to receive PDCCH or timing of determining whether or not PDSCH is actually transmitted. The reservation signal includes information on a transmission length of an anticipated PDSCH to inform a different transceiver intending to use the UScell that the channel is reserved.

Figure 10:
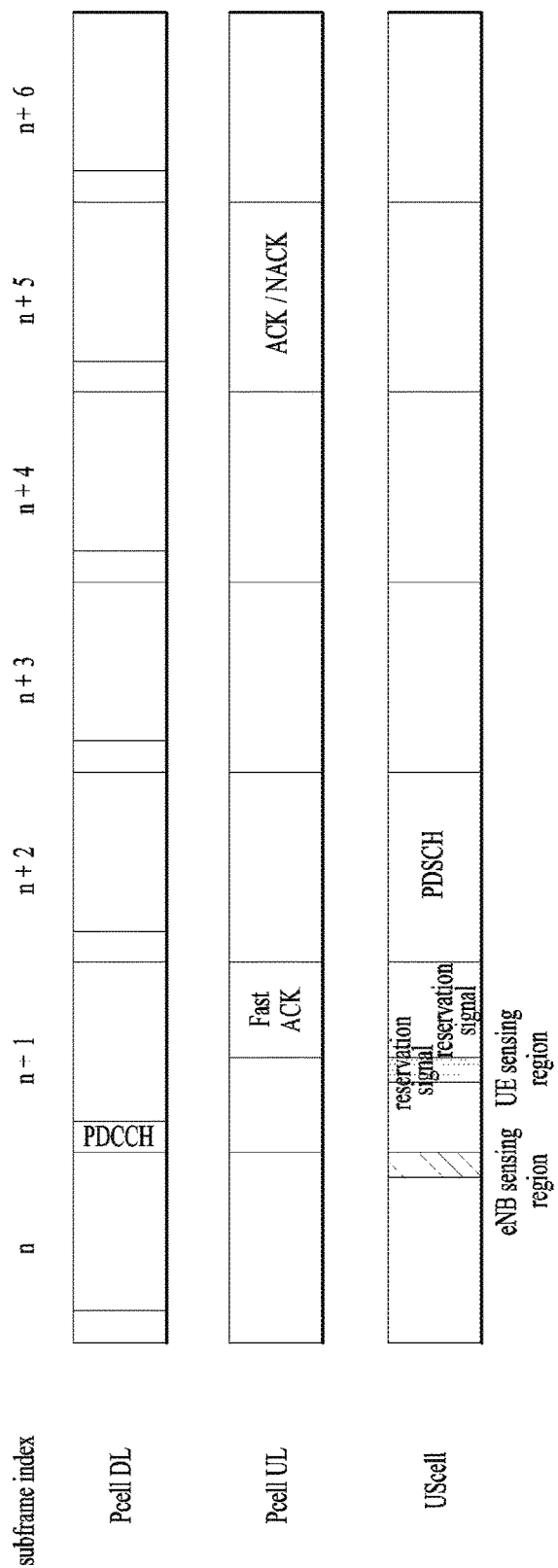
FIG. 10 is a diagram for a procedure according to one embodiment of the present invention.

As a variation of the proposed scheme, as shown in FIG. 10, since there is a time difference between timing of sensing the UScell sensed by the eNB to transmit PDCCH and timing of transmitting PDSCH, the eNB can transmit a reservation signal to the UScell to prevent an interference node from starting transmission between the timings. In this case, the eNB transmits the reservation signal from timing at which the sensing of the UScell is finished. Since the UE senses the UScell to which the reservation signal is transmitted from the eNB, when the UE senses the UScell, the UE estimates interference amount except the reservation signal. And, the UE can transmit the reservation signal from timing at which the sensing of the UScell is finished. In this case, the eNB corresponding to a transmitter and the UE corresponding to a receiver can transmit the reservation signal at the same time.

Figure 11:
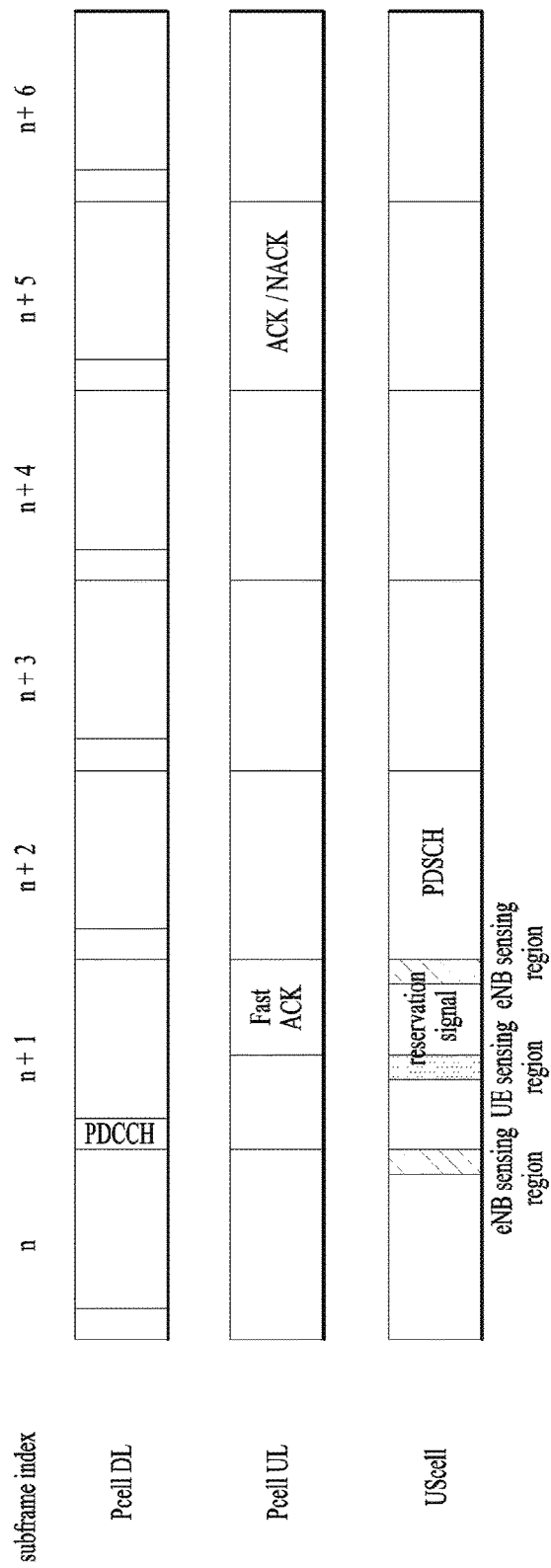
FIG. 11 is a diagram for a procedure according to one embodiment of the present invention.

As shown in FIG. 11, according to the proposed scheme, the eNB additionally performs channel sensing on the UScell immediately before PDSCH corresponding to PDCCH is actually transmitted to check whether or not a channel is idle. If the channel is idle, the eNB can transmit the PDSCH via the UScell. In this case, immediately before the PDCCH is transmitted, channel sensing on the UScell may not be performed. In particular, the PDCCH can be transmitted to the Pcell irrespective of a state of the UScell. However, a prerequisite for the eNB to practically transmit the PDSCH in the UScell is to determine both the report of the sensing result on the UScell, which is recently sensed at a location of the UE corresponding to a receiver, and the sensing result of the UScell, which is sensed immediately before the PDSCH is transmitted at a location of the eNB corresponding to a transmitter, as idle. If the prerequisite is satisfied, the PDSCH is transmitted in the UScell.

PDSCH Transmission Procedure 2-2, Reactive CCA

According to a scheme proposed in the present chapter, as a slight variation of the aforementioned PDSCH transmission procedure 2-1, a sensing indicator (SI) or a fast ACK is transmitted via the UScell only. Compared to the PDSCH transmission procedure 2-1, it may have a characteristic that PDCCH and PDSCH are transmitted in the same subframe. Hence, it may be able to have a merit capable of following a legacy LTE structure as it is in that ACK/NACK is transmitted in a subframe appearing after 4 subframes from a subframe in which PDSCH is transmitted.

Since PDSCH is transmitted after PDCCH transmission, sensing, and reporting are performed in a subframe, transmission time of the PDSCH can be shortened. In order to solve the problem, the PDSCH can be transmitted over two subframes. In particular, referring to FIG. 12, it may be able to configure transmission of the PDSCH to be finished in the middle of an SF n+2. This can be configured by providing a decimal point to a subframe boundary of the UScell rather than a subframe boundary of the Pcell. In particular, it may place 0.5 ms subframe offset between the Pcell and the UScell.

Figure 12:
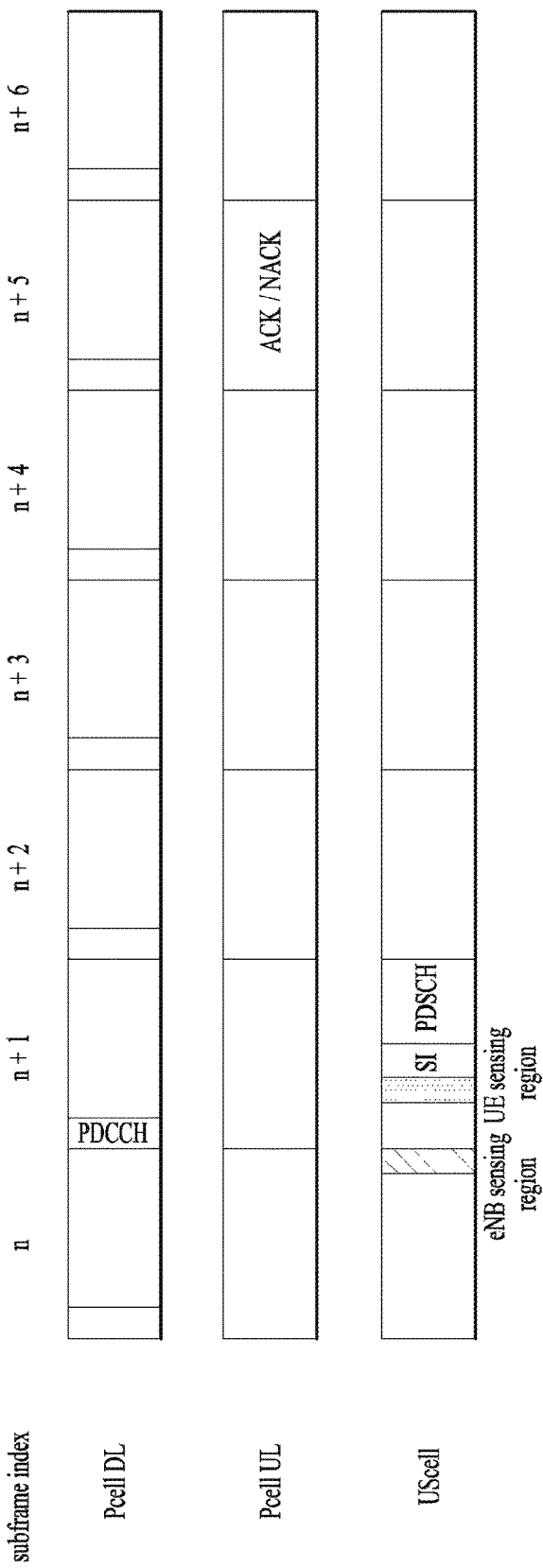
FIG. 12 is a diagram for a procedure according to one embodiment of the present invention.

As a variation of the embodiment of FIG. 12, the eNB can transmit a reservation signal from timing at which the sensing of the UScell is finished. In this case, since the UE senses the UScell to which the reservation signal is transmitted from the eNB, the UE estimates interference amount except the reservation signal when the UE senses the UScell.

As a different variation of the embodiment of FIG. 12, the eNB additionally performs channel sensing on the UScell immediately before PDSCH corresponding to PDCCH is actually transmitted to check whether or not a channel is idle. If the channel is idle, the eNB can transmit the PDSCH via the UScell. In this case, since the eNB senses the UScell to which a sensing indicator channel is transmitted from the UE, the eNB estimates interference amount except the sensing indicator channel when the eNB senses the UScell. According to the present variation scheme, immediately before the PDCCH is transmitted, channel sensing on the UScell may not be performed.

PUSCH Transmission Procedure

PUSCH Transmission Procedure 1

Figure 13:
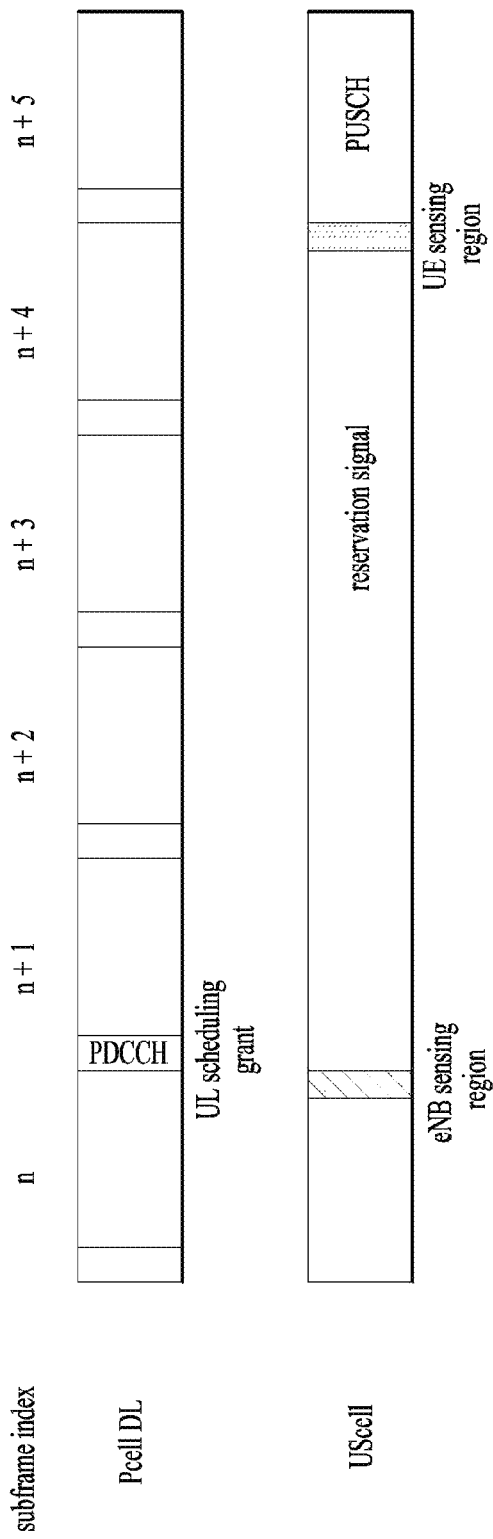
FIG. 13 is a diagram for a procedure according to one embodiment of the present invention.

In the present chapter, a method for the UE to transmit PUSCH in the UScell is proposed. According to the PUSCH transmission procedure 1, the eNB transmits an UScell UL scheduling grant to the UE via PDCCH. Having received the UL scheduling grant, the UE transmits PUSCH permitted by the UL grant in the UScell after prescribed time elapses. In this case, as shown in FIG. 13, the PDCCH is transmitted via the Pcell corresponding to a licensed band. The eNB performs sensing on the UScell immediately before PDCCH including the UScell UL scheduling grant is transmitted to the Pcell to check whether or not the UScell is in an idle state. The eNB can transmit the PDCCH including the UL scheduling grant only when the UScell is in the idle state. A region of the UScell sensed by the eNB can be restricted by a time length corresponding to several OFDM symbols before PDCCH is transmitted to the Pcell. The eNB performs sensing on the UScell during a partial time section of an SF n. The eNB can transmit the PDCCH including the UScell UL grant in an SF n+1 only when the S cell is in an idle state. If it is determined as the channel is busy according to the sensing result, the eNB does not transmit the PDCCH including the UScell UL scheduling grant.

In this case, in order for the eNB to perform sensing on the UScell and determine whether a channel is idle or busy, it may use one of methods described in the following.

The eNB measures reception power of the entire reception signals in the UScell and compares the measured reception power with a threshold. If the reception power is equal to or greater (or exceeds) than the threshold, it may determine that the channel is busy. Otherwise, it may determine that the channel is idle.

The eNB compares an increment of interference amount at the time of sensing in contrast with interference amount, which is measured at the timing of receiving SRS lastly received from a UE to be scheduled by the eNB, with a threshold. If the increment is equal to or greater (or exceeds) than the threshold, it may determine that the channel is busy. Otherwise, it may determine that the channel is idle.

The eNB compares an increment of interference amount at the time of sensing in contrast with interference amount, which is considered to determine MCS of a UE to be scheduled by the eNB, with a threshold. If the increment is equal to or greater (or exceeds) than the threshold, it may determine that the channel is busy. Otherwise, it may determine that the channel is idle.

According to the proposed scheme, having received the UScell UL scheduling grant, the UE performs sensing on the UScell immediately before the PUSCH permitted by the UL scheduling grant is transmitted in the UScell. As a result, if it is determined as the UScell is in an idle state, the UE can transmit the PUSCH. A region of the US cell sensed by the UE can be restricted by a time length corresponding to several OFDM symbols before PUSCH is transmitted to the UScell. The UE performs sensing on the UScell during a partial time section prior to timing at which the permitted PUSCH transmission starts. The UE can practically transmit the permitted PUSCH only when the UScell is idle. If it is determined that the channel is busy based on the channel sensing, the UE gives up the transmission of the permitted PUSCH.

In this case, in order for the UE to perform sensing on the UScell and determine whether a channel is idle or busy, it may use one of methods described in the following.

The UE measures reception power of the entire reception signals in the UScell and compares the measured reception power with a threshold. If the reception power is equal to or greater (or exceeds) than the threshold, it may determine that the channel is busy. Otherwise, it may determine that the channel is idle. In this case, the threshold can be determined in advance or can be configured by the eNB via higher layer signaling.

The UE compares an increment of interference amount at the time of sensing in contrast with interference amount, which is measured immediately before the lastly transmitted SRS is transmitted, with a threshold. If the increment is equal to or greater (or exceeds) than the threshold, it may determine that the channel is busy. Otherwise, it may determine that the channel is idle.

According to the proposed scheme, the eNB checks whether or not the UScell is idle immediately before transmitting a grant for PUSCH to receive the PUSCH. The UE checks whether or not the UScell is idle immediately before transmitting PUSCH to transmit the PUSCH. Hence, since there is a time difference between timing of transmitting the grant for the PUSCH and timing of transmitting the permitted PUSCH (or, sensing timing performed for each of the timings), the eNB can transmit a reservation signal to the UScell to prevent an interference node from starting transmission in the UScell between the timings. The eNB performs sensing on the UScell to transmit the grant for the PUSCH via the UScell. If it is determined as the UScell is idle, the eNB transmits the reservation signal until timing at which the UE starts to sense the UScell to determine whether or not the permitted PUSCH is practically transmitted.

According to the proposed scheme, as shown in FIG. 13, the eNB transmits the UScell UL scheduling grant to the UE via PDCCH in an SF n+1 to maintain a legacy LTE structure. Having received the UL scheduling grant, if the UE follows a legacy structure that the PUSCH permitted by the UScell UL scheduling grant is transmitted in an SF n+5, the reservation signal is transmitted for more than 3 msec, thereby deteriorating efficiency of the UScell. Of course, the eNB can transmit PDSCH to a specific UE instead of the reservation signal or may indicate the UE to transmit PUSCH to reserve a channel. However, if the aforementioned option is not available, the reservation signal is transmitted for more than 3 ms and a resource is inefficiently reserved. In order to prevent the problem, the eNB transmits the UScell UL scheduling grant in an SF n and the UE transmits permitted PUSCH permitted by the scheduling grant in an SF n+x. In this case, the x is configured by a value less than 4 to reduce transmission time of the reservation signal.

PUSCH Transmission Procedure 2-1

Figure 14:
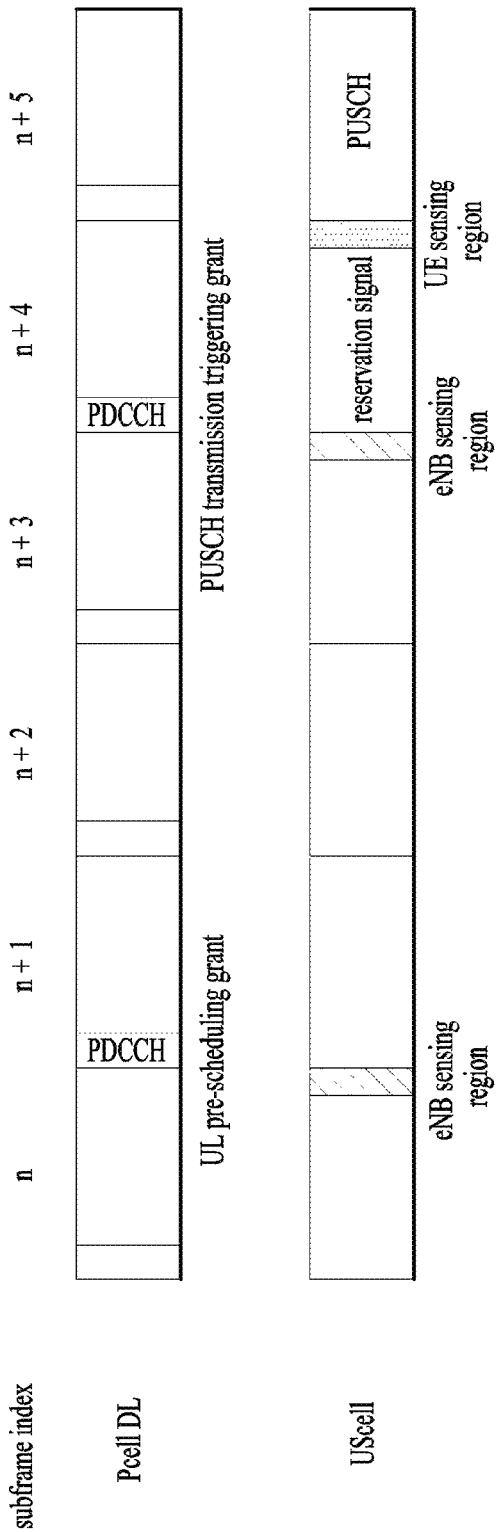
FIG. 14 is a diagram for a procedure according to one embodiment of the present invention.

According to the PUSCH transmission procedure 2-1, in order to guarantee transmission processing time of the UE, the eNB transmits an UScell UL pre-scheduling grant to the UE prior to PUSCH transmission as much as x[ms] to make the UE prepare the PUSCH transmission and transmits a triggering grant to the UE immediately before the timing of transmitting the PUSCH to finally grant the PUSCH transmission of the UE. As shown in FIG. 14, the eNB transmits the UScell UL pre-scheduling grant to the UE in an SF n+1 and transmits the triggering grant of the PUSCH transmission to the UE in an SF n+4 to make the UE transmit the PUSCH in an SF n+5 in the UScell.

First eNB Sensing

The eNB performs sensing on the UScell immediately before PDCCH including UScell UL (PUSCH) pre-scheduling grant is transmitted to the Pcell. As a result, the eNB can transmit the PDCCH including the UL pre-scheduling grant only when the UScell is in an idle state. The eNB performs sensing on the UScell during a partial time section of an SF n. As a result, the eNB can transmit the PDCCH including the UL pre-scheduling grant only when the UScell is in an idle state. Yet, if it is determined as a channel is in a busy state, the eNB does not transmit the PDCCH including the UL pre-scheduling grant.

In this case, in order for the eNB to perform sensing on the UScell and determine whether a channel is idle or busy to transmit the UL pre-scheduling grant, it may use one of methods described in the following.

The eNB measures reception power of the entire reception signals in the UScell and compares the measured reception power with a threshold. If the reception power is equal to or greater (or exceeds) than the threshold, it may determine that the channel is busy. Otherwise, it may determine that the channel is idle.

The eNB compares an increment of interference amount at the time of sensing in contrast with interference amount, which is measured at the timing of receiving SRS lastly received from a UE to be scheduled by the eNB, with a threshold. If the increment is equal to or greater (or exceeds) than the threshold, it may determine that the channel is busy. Otherwise, it may determine that the channel is idle.

The eNB compares an increment of interference amount at the time of sensing in contrast with interference amount, which is considered to determine MCS of a UE to be scheduled by the eNB, with a threshold. If the increment is equal to or greater (or exceeds) than the threshold, it may determine that the channel is busy. Otherwise, it may determine that the channel is idle.

Second eNB Sensing

The eNB performs sensing on the UScell immediately before PDCCH including UScell PUSCH triggering grant is transmitted to the Pcell. As a result, the eNB can transmit the PDCCH including the UScell PUSCH triggering grant only when the UScell is in an idle state. As shown in FIG. 14, the eNB performs sensing on the UScell during a partial time section of an SF n+3. As a result, the eNB can transmit the PDCCH including the UScell PUSCH triggering grant only when the UScell is in an idle state. Yet, if it is determined as a channel is in a busy state, the eNB does not transmit the PDCCH including the UScell PUSCH triggering grant.

In this case, in order for the eNB to perform sensing on the UScell and determine whether a channel is idle or busy to transmit the UScell PUSCH triggering grant, it may use one of methods described in the following.

The eNB measures reception power of the entire reception signals in the UScell and compares the measured reception power with a threshold (threshold-tri). If the reception power is equal to or greater (or exceeds) than the threshold, it may determine that the channel is busy. Otherwise, it may determine that the channel is idle.

The eNB compares an increment of interference amount at the time of sensing in contrast with interference amount, which is considered to determine MCS of a UE assigned to the UE via the pre-scheduling grant, with a threshold. If the increment is equal to or greater (or exceeds) than the threshold, it may determine that the channel is busy. Otherwise, it may determine that the channel is idle.

A method for the eNB to determine whether a channel is idle or busy to transmit the UScell PUSCH pre-scheduling grant and a method for the eNB to determine whether a channel is idle or busy to transmit the UScell PUSCH triggering grant can be differently configured. And, although the same method is used, a threshold for determining whether a channel is idle or busy can be individually configured. As a representative example, it may be able to configure a threshold (threshold_pre) for the UScell PUSCH pre-scheduling grant to be lower than a threshold (threshold_tri) for the UScell PUSCH triggering grant. By doing so, although an interference amount immediately before the UScell PUSCH triggering grant is transmitted increases equal to or less than (threshold_tri−threshold_pre) compared to an interference amount immediately before the UScell PUSCH pre-scheduling grant is transmitted, it may be able to permit transmission of the UScell PUSCH triggering grant. This method is appropriate for transmitting the UScell PUSCH triggering grant when there is no considerable increase of the interference amount to the UE which have transmitted the UScell PUSCH pre-scheduling grant. On the contrary, it may configure "threshold_pre" to be higher than "threshold_tri". By doing so, although an interference amount is high, it may transmit the UScell PUSCH pre-scheduling grant. It may transmit the UScell PUSCH triggering grant by strictly determining whether or not the interference amount is under a controllable line immediately before the UScell PUSCH triggering grant is transmitted.

Figure 15:
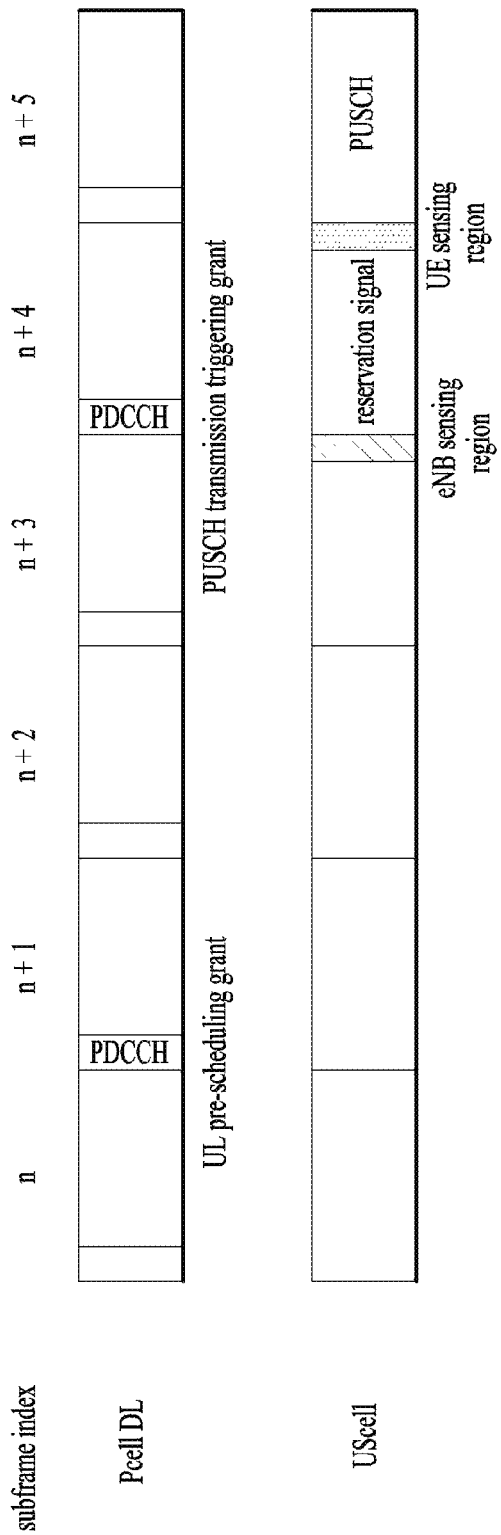
FIG. 15 is a diagram for a procedure according to one embodiment of the present invention.

In this case, if "threshold_pre" is configured to be infinite, the UScell PUSCH pre-scheduling is transmitted irrespective of a sensing result. In particular, it may be able to configure the UScell PUSCH pre-scheduling grant to be transmitted without performing sensing and configure the UScell PUSCH triggering grant to be transmitted only when a channel is idle according to a sensing result. In particular, as shown in FIG. 15, sensing of the eNB can be performed only immediately before the UScell PUSCH triggering grant is transmitted.

According to the proposed scheme, having received the UScell PUSCH pre-scheduling grant, the UE prepares a radio resource region permitted by the UScell PUSCH pre-scheduling grant and transmission of PUSCH appropriate for an MCS level. The transmission of the prepared PUSCH is finally permitted by receiving the UScell PUSCH triggering grant. In order to forward information on whether or not the transmission of the PUSCH is finally permitted via the UScell PUSCH triggering grant, it may use one of methods described in the following.

If the UScell PUSCH triggering grant is received at determined timing appearing after timing at which the UScell PUSCH pre-scheduling grant is received, the UE can determine it as an approval. Otherwise, the UE can determine it as a non-approval.

The UE can determine a final approval or a non-approval depending on information included in the UScell PUSCH triggering grant, which is received at determined timing appearing after timing at which the UScell PUSCH pre-scheduling grant is received, among approval information and non-approval information.

The UE can determine a final approval or a non-approval based on information on whether or not the UScell PUSCH triggering grant for finally granting the UScell PUSCH pre-scheduling grant is received in a determined time window appearing after timing of receiving the US cell PUSCH pre-scheduling grant. In this case, the UScell PUSCH triggering grant can include information on an SF in which the UScell PUSCH pre-scheduling grant is finally permitted or information on a HARQ process for which the UScell PUSCH pre-scheduling grant is finally permitted.

If the transmission of the prepared PUSCH is finally not permitted, the UE gives up the transmission of the prepared PUSCH. On the contrary, in order to transmit the finally permitted PUSCH in the UScell, the UE performs sensing on the UScell immediately before the finally permitted PUSCH is transmitted. As a result, the UE can transmit the PUSCH only when the UScell is in an idle state. The UE performs sensing on the UScell during a partial time section prior to timing at which transmission of the finally permitted PUSCH starts. As a result, the UE can practically transmit the finally permitted PUSCH only when the UScell is in the idle state. Yet, if it is determined as the channel is busy, the UE gives up the transmission of the finally permitted PUSCH.

In this case, in order for the UE to perform sensing on the UScell and determine whether a channel is idle or busy, it may use one of methods described in the following.

The UE measures reception power of the entire reception signals in the UScell and compares the measured reception power with a threshold. If the reception power is equal to or greater (or exceeds) than the threshold, it may determine that the channel is busy. Otherwise, it may determine that the channel is idle. In this case, the threshold can be determined in advance or can be configured by the eNB via higher layer signaling.

The UE compares an increment of interference amount at the time of sensing in contrast with interference amount, which is measured immediately before the lastly transmitted SRS is transmitted, with a threshold. If the increment is equal to or greater (or exceeds) than the threshold, it may determine that the channel is busy. Otherwise, it may determine that the channel is idle.

According to the proposed scheme, the eNB checks whether or not the UScell is idle immediately before transmitting the UScell PUSCH triggering grant for PUSCH to receive the PUSCH. The UE checks whether or not the UScell is idle immediately before transmitting PUSCH to transmit the PUSCH. Hence, since there is a time difference between timing of transmitting the triggering grant for the UScell PUSCH and timing of transmitting the permitted UScell PUSCH, the eNB can transmit a reservation signal to the US cell to prevent an interference node from starting transmission in the UScell between the timings. The eNB performs sensing on the UScell to transmit the triggering grant for the UCell PUSCH. If it is determined as the UScell is idle, the eNB transmits the reservation signal until timing at which the UE starts to sense the UScell to determine whether or not the permitted UScell PUSCH is practically transmitted.

PUSCH Transmission Procedure 2-2

According to a scheme proposed in the present chapter, as a slight variation of the aforementioned PUSCH transmission procedure 2-1, it may be able to configure the UScell PUSCH triggering grant to be transmitted via the UScell. Compared to the PUSCH transmission procedure 2-1, since the UScell PUSCH triggering grant is transmitted via the UScell immediately before a UE sensing region or timing, it is not necessary to transmit a reservation signal. In addition to the PUSCH transmission procedure 2-1, it may be able to configure the PUSCH triggering grant transmitted via the UScell to include information on a transmission length of PUSCH to be permitted in the future. The information can be used for the usage of informing a different transceiver intending to use the UScell that the channel is reserved. According to the proposed scheme, as shown in FIG. 16, UE sensing can be performed by measuring an interference amount of the remaining interference signal except the UScell PUSCH triggering grant signal while the UScell PUSCH triggering grant is received without providing a separate region or a time section for the UE sensing.

Figure 16:
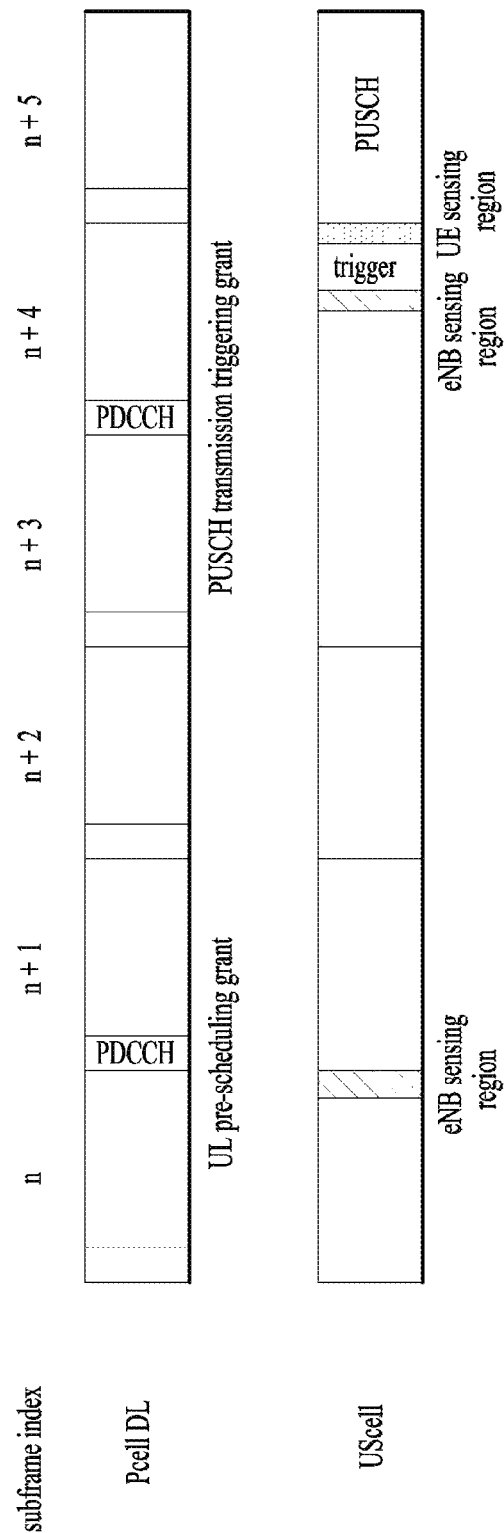
FIG. 16 is a diagram for a procedure according to one embodiment of the present invention.

As a variation of the embodiment of FIG. 16, the eNB may not perform sensing on the UScell before the UScell pre-scheduling grant is transmitted. The UE may perform the sensing on the UScell immediately before the UScell PUSCH triggering grant is transmitted only.

Figure 17:
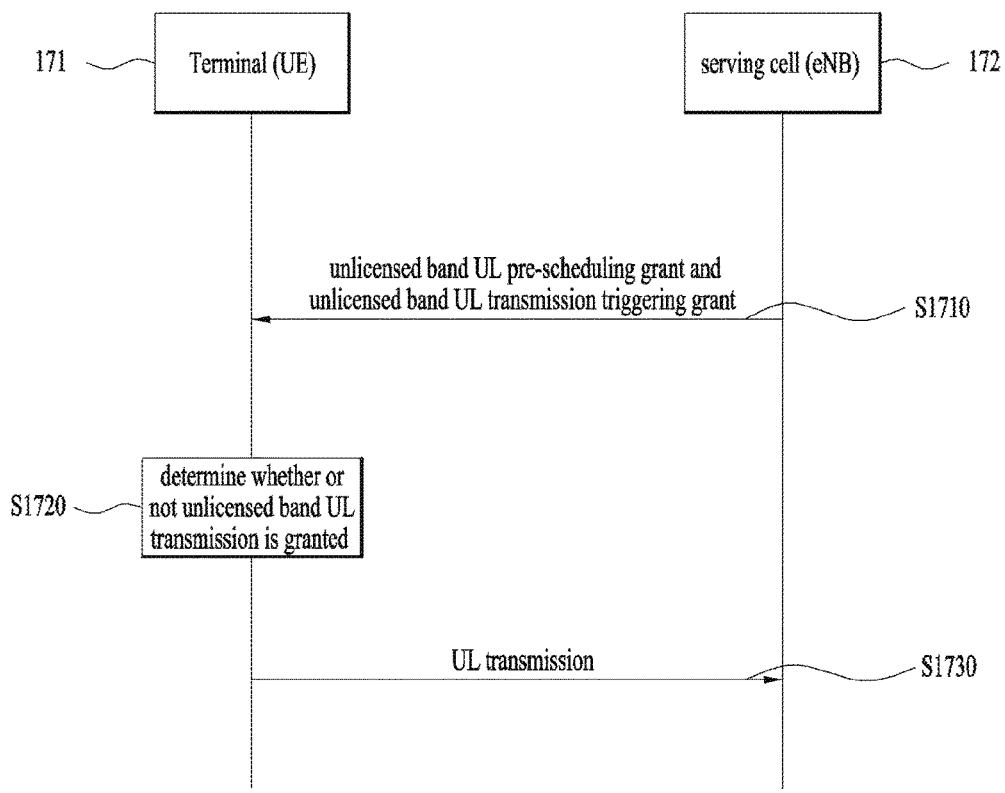
FIG. 17 is a diagram for a procedure according to one embodiment of the present invention.

FIG. 17 is a diagram for operations according to one embodiment of the present invention.

FIG. 17 relates to a method of performing uplink (UL) transmission on an unlicensed band-secondary carrier according to one embodiment of the present invention. A terminal 171 may receive a first channel in which an unlicensed band UL pre-scheduling grant is included and a second channel in which an unlicensed band UL transmission triggering grant is included from a base station 172 on a primary carrier [S1710]. In this case, the first channel and the second channel may be sequentially received with a predetermined time interval. The predetermined time interval may be represented in a subframe unit.

The terminal may determine whether or not the unlicensed band UL transmission is granted based on the received first and second channels [S1720].

If it is determined as the unlicensed band UL transmission is granted, the terminal may perform the UL transmission via a channel of the unlicensed band-secondary carrier only when the channel of the unlicensed band-secondary carrier is in an idle state [S1730].

If the second channel is received at predetermined timing after the first channel is received, the terminal may determine it as the unlicensed band UL transmission is granted. Or, if a second channel including an indicator indicating that the unlicensed band UL transmission is permitted is received at predetermined timing after the first channel is received, the terminal may determine it as the unlicensed band UL transmission is granted. Or, if the second channel is received within a predetermined time window after the first channel is received, the terminal may determine it as the unlicensed band UL transmission is granted. In this case, an unlicensed band UL transmission triggering grant included in the second channel may include information on an unlicensed band UL pre-scheduling grant corresponding to a target of the unlicensed band UL transmission triggering grant.

The unlicensed band UL transmission triggering grant may include information on a length of UL transmission to be transmitted on the unlicensed band.

The second channel may be received on the unlicensed band-secondary carrier.

In order to check whether or not a channel of the unlicensed band-secondary carrier is in an idle state, the terminal may perform channel sensing on the channel of the unlicensed band-secondary carrier.

The terminal may compare the total reception power of the channel of the unlicensed band-secondary carrier with a threshold configured via higher layer signaling. If the total reception power is greater than the threshold, it may determine as the channel of the unlicensed band-secondary carrier is in a busy state. If the total reception power is not greater than the threshold, it may determine as the channel of the unlicensed band-secondary carrier is in an idle state.

The terminal may compare an increment of an interference amount measured on the channel of the unlicensed band-secondary carrier in contrast with an interference amount, which is measured immediately before a sounding reference signal has been transmitted most recently is transmitted, with a threshold configured via higher layer signaling. If the increment is greater than the threshold, it may determine as the channel of the unlicensed band-secondary carrier is in a busy state. If the increment is not greater than the threshold, it may determine as the channel of the unlicensed band-secondary carrier is in an idle state.

The operations of the terminal or the base station shown in FIG. 17 can include not only the embodiment mentioned earlier with reference to FIG. 17, but also at least one selected from the aforementioned concrete embodiments of the present invention.

Figure 18:
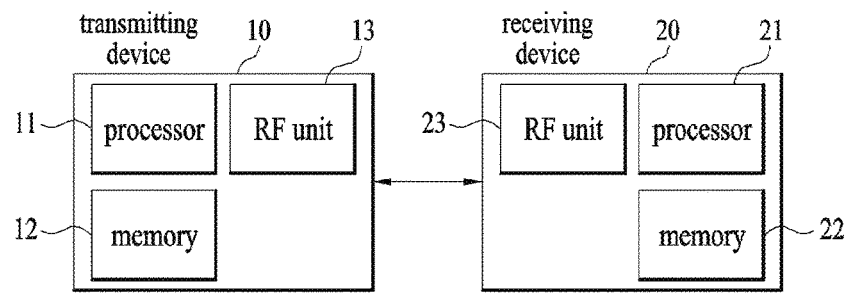
FIG. 18 is a block diagram for a device for implementing embodiment(s) of the present invention.

FIG. 18 is a block diagram of a transmitting device 10 and a receiving device 20 configured to implement exemplary embodiments of the present invention. Referring to FIG. 18, the transmitting device 10 and the receiving device 20 respectively include radio frequency (RF) units 13 and 23 for transmitting and receiving radio signals carrying information, data, signals, and/or messages, memories 12 and 22 for storing information related to communication in a wireless communication system, and processors 11 and 21 connected operationally to the RF units 13 and 23 and the memories 12 and 22 and configured to control the memories 12 and 22 and/or the RF units 13 and 23 so as to perform at least one of the above-described embodiments of the present invention.

The memories 12 and 22 may store programs for processing and control of the processors 11 and 21 and may temporarily storing input/output information. The memories 12 and 22 may be used as buffers. The processors 11 and 21 control the overall operation of various modules in the transmitting device 10 or the receiving device 20. The processors 11 and 21 may perform various control functions to implement the present invention. The processors 11 and 21 may be controllers, microcontrollers, microprocessors, or microcomputers. The processors 11 and 21 may be implemented by hardware, firmware, software, or a combination thereof. In a hardware configuration, Application Specific Integrated Circuits (ASICs), Digital Signal Processors (DSPs), Digital Signal Processing Devices (DSPDs), Programmable Logic Devices (PLDs), or Field Programmable Gate Arrays (FPGAs) may be included in the processors 11 and 21. If the present invention is implemented using firmware or software, firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 10 is scheduled from the processor 11 or a scheduler connected to the processor 11 and codes and modulates signals and/or data to be transmitted to the outside. The coded and modulated signals and/or data are transmitted to the RF unit 13. For example, the processor 11 converts a data stream to be transmitted into K layers through demultiplexing, channel coding, scrambling and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the RF unit 13 may include an oscillator. The RF unit 13 may include Nt (where Nt is a positive integer) transmit antennas.

A signal processing process of the receiving device 20 is the reverse of the signal processing process of the transmitting device 10. Under the control of the processor 21, the RF unit 23 of the receiving device 10 receives RF signals transmitted by the transmitting device 10. The RF unit 23 may include Nr receive antennas and frequency down-converts each signal received through receive antennas into a baseband signal. The RF unit 23 may include an oscillator for frequency down-conversion. The processor 21 decodes and demodulates the radio signals received through the receive antennas and restores data that the transmitting device 10 wishes to transmit.

The RF units 13 and 23 include one or more antennas. An antenna performs a function of transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. A signal transmitted through each antenna cannot be decomposed by the receiving device 20. A reference signal (RS) transmitted through an antenna defines the corresponding antenna viewed from the receiving device 20 and enables the receiving device 20 to perform channel estimation for the antenna, irrespective of whether a channel is a single RF channel from one physical antenna or a composite channel from a plurality of physical antenna elements including the antenna. That is, an antenna is defined such that a channel transmitting a symbol on the antenna may be derived from the channel transmitting another symbol on the same antenna. An RF unit supporting a MIMO function of transmitting and receiving data using a plurality of antennas may be connected to two or more antennas.

In embodiments of the present invention, a UE serves as the transmission device 10 on uplink and as the receiving device 20 on downlink. In embodiments of the present invention, an eNB serves as the receiving device 20 on uplink and as the transmission device 10 on downlink.

The transmitting device and/or the receiving device may be configured as a combination of one or more embodiments of the present invention.

It will be apparent to those skilled in the art that various modifications and variations can be made in the present invention without departing from the scope of the inventions. Thus, it is intended that the present invention covers the modifications and variations of this invention provided they come within the scope of the appended claims and their equivalents.

INDUSTRIAL APPLICABILITY

The present invention is applicable to a wireless communication device such as a mobile terminal, relay, or base station.

What is claimed is:

1. A method of performing uplink (UL) transmission, which is performed by a terminal on an unlicensed band-secondary carrier, comprising:
   receiving a first channel in which an unlicensed band UL pre-scheduling grant is contained and a second channel in which an unlicensed band UL transmission triggering grant is contained on a primary carrier;
   determining whether or not the unlicensed band UL transmission is granted based on the received first channel and the second channel; and
   when it is determined that the unlicensed band UL transmission is permitted, performing the UL transmission via a channel of the unlicensed band-secondary carrier only when the channel of the unlicensed band-secondary carrier is in an idle state,
   wherein the first channel and the second channel are sequentially received with a predetermined time interval,
   wherein the unlicensed band UL transmission is determined as being granted when the second channel is received within a predetermined time window after the first channel is received, and
   wherein the unlicensed band UL transmission triggering grant contained in the second channel includes information on an unlicensed band UL pre-scheduling grant which is a target of the unlicensed band UL transmission triggering grant.

2. The method of claim 1, wherein the unlicensed band UL transmission triggering grant includes information on a length of UL transmission to be transmitted on the unlicensed band.

3. The method of claim 1, wherein the second channel is received on the unlicensed band-secondary carrier.

4. The method of claim 1, further comprising performing channel sensing on the channel of the unlicensed-secondary carrier to check whether or not the channel of the unlicensed band-secondary carrier is in an idle state.

5. The method of claim 4, further comprising:
   comparing a total reception power of the channel of the unlicensed band-secondary carrier with a threshold configured via higher layer signaling,
   wherein, when the total reception power is greater than the threshold, the channel of the unlicensed band-secondary carrier is determined as a busy state, and
   wherein, when the total reception power is not greater than the threshold, the channel of the unlicensed band-secondary carrier is determined as an idle state.

6. The method of claim 4, further comprising:
   comparing an increment of an interference amount measured on the channel of the unlicensed band-secondary carrier on an interference amount, which is measured immediately before a sounding reference signal which has been transmitted most recently is transmitted, with a threshold configured via higher layer signaling,
   wherein, when the increment is greater than the threshold, the channel of the unlicensed band-secondary carrier is determined as a busy state, and
   wherein, when the increment is not greater than the threshold, the channel of the unlicensed band-secondary carrier is determined as an idle state.

7. A terminal configured to transmit uplink (UL) on an unlicensed band-secondary carrier, comprising:
   an radio frequency (RF) unit; and
   a processor that controls the RF unit, wherein the processor:

receives a first channel in which an unlicensed band UL pre-scheduling grant is contained and a second channel in which an unlicensed band UL transmission triggering grant is contained on a primary carrier, determines whether or not the unlicensed band UL transmission is granted based on the received first channel and the second channel, and when it is determined that the unlicensed band UL transmission is granted, performs the UL transmission via a channel of the unlicensed band-secondary carrier only when the channel of the unlicensed band-secondary carrier is in an idle state, wherein the first channel and the second channel are sequentially received with a predetermined time interval, wherein the unlicensed band UL transmission is determined as being granted when the second channel is received within a predetermined time window after the first channel is received, and wherein the unlicensed band UL transmission triggering grant contained in the second channel includes information on an unlicensed band UL pre-scheduling grant which is a target of the unlicensed band UL transmission triggering grant.

8. The terminal of claim 7, wherein the unlicensed band UL transmission triggering grant includes information on a length of UL transmission to be transmitted on the unlicensed band.

9. The terminal of claim 7, wherein the second channel is received on the unlicensed band-secondary carrier.

10. The terminal of claim 7, wherein the processor performs channel sensing on the channel of the unlicensed-secondary carrier to check whether or not the channel of the unlicensed band-secondary carrier is in an idle state.

11. The terminal of claim 10, wherein the processor compares the a total reception power of the channel of the unlicensed band-secondary carrier with a threshold configured via higher layer signaling, wherein, when the total reception power is greater than the threshold, the channel of the unlicensed band-secondary carrier is determined as a busy state, and wherein, when the total reception power is not greater than the threshold, the channel of the unlicensed band-secondary carrier is determined as an idle state.

12. The terminal of claim 10, wherein the processor compares an increment of an interference amount measured on the channel of the unlicensed band-secondary carrier on an interference amount, which is measured immediately before a sounding reference signal which has been transmitted most recently is transmitted, with a threshold configured via higher layer signaling, wherein, when the increment is greater than the threshold, the channel of the unlicensed band-secondary carrier is determined as a busy state, and wherein, when the increment is not greater than the threshold, the channel of the unlicensed band-secondary carrier is determined as an idle state.

* * * * *